(12) United States Patent
Oshiba

(10) Patent No.: US 11,303,552 B2
(45) Date of Patent: Apr. 12, 2022

(54) RECEIVER, COMMUNICATION SYSTEM, AVAILABLE BANDWIDTH ESTIMATION METHOD, AND STORAGE MEDIUM IN WHICH PROGRAM IS STORED

(71) Applicant: NEC Corporation, Tokyo (JP)

(72) Inventor: Takashi Oshiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/770,485

(22) PCT Filed: Dec. 13, 2018

(86) PCT No.: PCT/JP2018/045865
§ 371 (c)(1),
(2) Date: Jun. 5, 2020

(87) PCT Pub. No.: WO2019/117246
PCT Pub. Date: Jun. 20, 2019

(65) Prior Publication Data
US 2020/0389381 A1    Dec. 10, 2020

(30) Foreign Application Priority Data
Dec. 15, 2017 (JP) .............................. JP2017-240335

(51) Int. Cl.
*H04L 12/26* (2006.01)
*H04L 12/841* (2013.01)
(Continued)

(52) U.S. Cl.
CPC ...... *H04L 43/0882* (2013.01); *H04L 43/0894* (2013.01); *H04L 43/10* (2013.01); *H04L 47/283* (2013.01); *H04W 24/06* (2013.01)

(58) Field of Classification Search
CPC ..... H04L 43/16; H04L 43/0829; H04L 43/10; H04L 43/0894; H04L 43/045;
(Continued)

(56) References Cited

U.S. PATENT DOCUMENTS 9,270,569 B2    2/2016  Jeon et al.
2006/0234737 A1*  10/2006  Neumann ............... H03L 1/026
                                                    455/502
(Continued)

FOREIGN PATENT DOCUMENTS

JP    2008-199451 A    8/2008
JP    2011-188284 A    9/2011
(Continued)

OTHER PUBLICATIONS

Japanese Office Action for JP Application No. 2019-559197 dated Jun. 22, 2021 with English Translation.
(Continued)

*Primary Examiner* — Jianye Wu

(57) ABSTRACT

A receiver includes a reception part, a determination part, and an estimation part. The reception part receives a packet train(s) formed by a plurality of packets transmitted from a transmitter. The determination part determines whether bandwidth limitation is executed in a network based on the received packet train(s). The estimation part selects a method for estimating an available bandwidth in the network based on whether or not the bandwidth limitation is executed and estimates the available bandwidth in the network in accordance with the selected method.

18 Claims, 25 Drawing Sheets

(51) Int. Cl.
    *H04W 24/06* (2009.01)
    *H04L 43/0882* (2022.01)
    *H04L 43/0894* (2022.01)
    *H04L 43/10* (2022.01)
    *H04L 47/283* (2022.01)

(58) Field of Classification Search
    CPC ... H04L 43/0882; H04L 29/14; H04L 47/283; H04L 47/32; H04L 47/20; H04W 24/06
    See application file for complete search history.

(56) References Cited

U.S. PATENT DOCUMENTS

| | | | | |
|---|---|---|---|---|
| 2007/0217448 | A1* | 9/2007 | Luo | H04L 47/115 370/468 |
| 2014/0119214 | A1 | 5/2014 | Jeon et al. | |
| 2016/0043925 | A1* | 2/2016 | Rodbro | H04L 47/18 370/252 |
| 2018/0375780 | A1 | 12/2018 | Sawabe | |

FOREIGN PATENT DOCUMENTS

| | | |
|---|---|---|
| JP | 2013-157958 A | 8/2013 |
| JP | 2014-068214 A | 4/2014 |
| JP | 2014-093769 A | 5/2014 |
| JP | 5928574 B | 6/2016 |
| JP | 2017-139521 A | 8/2017 |
| WO | WO 2017/110675 A1 | 6/2017 |
| WO | WO 2017/199867 A1 | 11/2017 |

OTHER PUBLICATIONS

Satoda et al., "Network Traffic Estimation and Prediction Technologies for Improving User-perceived Quality", IEICE Technical Report, Japan, The Institute of Electronics, Information and Communication Engineers, Nov. 7, 2013, vol. 113 No. 292, pp. 29-34.

International Search Report dated Jan. 15, 2019, in corresponding PCT international Application.

* cited by examiner

| PAIR NUMBER | PACKET SIZE 1 | PACKET SIZE 2 | RECEPTION INTERVAL | PHYSICAL BANDWIDTH |
|---|---|---|---|---|
| 1 | A1 [byte] | A2 [byte] | T1 [ms] | A1/T1 |
| 2 | A2 [byte] | A3 [byte] | T2 [ms] | A2/T2 |
| 3 | A3 [byte] | A4 [byte] | T3 [ms] | A3/T3 |
| 4 | A4 [byte] | A5 [byte] | T4 [ms] | A4/T4 |

RECEIVER, COMMUNICATION SYSTEM, AVAILABLE BANDWIDTH ESTIMATION METHOD, AND STORAGE MEDIUM IN WHICH PROGRAM IS STORED

REFERENCE TO RELATED APPLICATION

This application is a National Stage Entry of International Application No. PCT/JP2018/045865, filed Dec. 13, 2018, which claims priority from Japanese Patent Application No. JP 2017-240335, filed Dec. 15, 2017. The entire contents of the above-referenced applications are expressly incorporated herein by reference.

TECHNICAL FIELD

The present invention relates to a receiver, a communication system, an available bandwidth estimation method, and a storage medium in which a program is stored.

BACKGROUND

In recent years, various kinds of services using networks have been provided along with advancement in network technology and information processing technology. For example, there are services such as video conference services in which terminals at remote places are connected to each other and video and voice are transmitted and received and video streaming services in which users download multimedia data from servers and view moving images, etc.

When such a service is provided, appropriately estimating the available bandwidth (also referred to as the usable bandwidth) of a corresponding network is demanded. The "available bandwidth" is a free bandwidth obtained by subtracting the bandwidth of other traffic (cross traffic) flowing through the network from the physical bandwidth of a bottleneck link of a corresponding communication line.

In the case of any one of the above services, unless the available bandwidth is accurately estimated and communication control processing is performed based on the estimated available bandwidth, the quality of the service (QoE; Quality of Experience) that the users perceive could decrease. For example, in a video conference or the like, unless the video transmission rate is set to be lower than the available bandwidth, audio or video could be frequently interrupted, and the users could feel discomfort. In other words, by setting the video transmission rate to be a value equal to or less than an estimated value of the available bandwidth, a total value of the video transmission rate and the cross traffic can be prevented from exceeding the physical bandwidth, and consequently, the decrease of the QoE due to packet loss can be prevented.

Various methods for estimating the physical bandwidth or the available bandwidth of a network have been proposed.

PTL 1 discloses a method for estimating a physical bandwidth by using a so-called packet pair. When a physical bandwidth is estimated by using a packet pair, a transmitting end transmits a packet pair of two packets (probing packets). A receiving end measures the reception interval of the two packets and estimates the physical bandwidth from the reception interval and the sizes of the packets of the packet pair.

PTLs 2 and 3 disclose a method for estimating an available bandwidth by using a packet train formed by a plurality of packets. The bandwidth estimation based on a packet train is roughly performed as follows. First, a transmitting end transmits a packet whose packet size gradually increases at certain transmission intervals. While these packets are transmitted at certain intervals, since the packet size gradually increases, the transmission rate gradually increases. As the packets pass through the network in which the transmission rate of the individual packet could be a bottleneck, if the transmission rate exceeds the available bandwidth, queuing delay occurs. Namely, if queuing delay occurs, the transmission interval, which has originally been constant, gradually increases. A receiving end determines a packet that causes such queuing delay by detecting a point when the transmission interval (reception interval) increases and estimates the available bandwidth by dividing the size of the packet by the transmission interval.

PTL 4 discloses a bandwidth limitation apparatus that limits the number of packets flowing to a wired network. According to PTL 4, when the transmission rate of a packet transmitted from a data transmission terminal to the wired network exceeds an upper value, the bandwidth limitation apparatus discards the excess packet.

PTL 1: Japanese Patent Kokai Publication No. JP2014-093769A
PTL 2: Japanese Patent No. JP5928574
PTL 3: Internatinoal Publication No. 2017/110675
PTL 4: Japanese Patent Kokai Publication No. JP2014-068214A

SUMMARY

As the carriers that provide users with wireless connection, there are mobile network operators (MNOs) that have communication line networks and mobile virtual network operators (MVNOs) that do not have communication line networks. These carriers perform bandwidth limitation on their terminals as needed when a predetermined condition, etc. are satisfied.

Examples of the bandwidth limitation include shaping and policing. Shaping is a technique of reducing the communication rate (the transmission rate, the communication bandwidth) between apparatuses to a predetermined value or less by buffering transmitted and received packets. Policing is a technique of monitoring the communication rate of an individual packet transmitted and received and discarding the packets whose communication rates are over a predetermined communication rate. In shaping, since the corresponding memory buffer cannot hold more packets than its capacity, the packets that cannot be stored in the buffer are also discarded.

For example, an MNO performs, as needed, bandwidth limitation on terminals that have transmitted and received a large amount of data within a certain period. In addition, an MVNO may perform bandwidth limitation in a time period in which networks are jammed.

FIG. 24 illustrates an example of results obtained by measuring a communication bandwidth of an MVNO. As illustrated in FIG. 24, it is assumed that bandwidth limitation is executed in time periods in the morning (time T1 to T2), around noon (time T3 to T4), and in the evening (time T5 to T6).

As a result of intensive studies by the present inventors, it has been determined that, if the available bandwidth estimation technique using a packet train disclosed in PTL 2 or 3 is applied in an environment in which bandwidth limitation is executed, the estimation results include large errors.

FIG. 25 illustrates an example of results obtained by estimating the available bandwidth of a communication by an MVNO. In FIG. 25, a solid line represents measured values (true values) of the available bandwidth, and a dotted line represents the available bandwidth estimated by the technique disclosed in PTL 2 (the technique using a packet train). As illustrated in FIG. 25, it is seen that, while high estimation results have been obtained in time T1 to T2 in which no bandwidth limitation is executed, the estimated values are greatly deviated from the actual available bandwidth (true values) in time T3 to T4 in which bandwidth limitation has probably been executed.

As described above, estimation of the available bandwidth using a packet train is performed by using a point when the reception interval exceeds the transmission interval. In this estimation, when a packet is discarded by bandwidth limitation, since the receiving end does not assume such packet discard, the calculated reception interval, etc. are greatly deviated from the actual interval. Since the available bandwidth is estimated based on this greatly deviated reception interval, an accurate estimation result cannot presumably be acquired.

Since these available bandwidth estimation results affect the quality of the service provided to the corresponding users, accurate available bandwidth estimation is demanded even in a situation in which bandwidth limitation is executed. For example, in FIG. 25, in the time period between T1 and T2, a high-rate available bandwidth has been measured, and the estimated values in this period indicate almost the same as the measured available bandwidth. In contrast, in the time period between T3 to T4 in which bandwidth limitation has probably been executed, although the available bandwidth has been dropped to a very low rate, the individual estimated value of the available bandwidth indicates a high-rate available bandwidth. If a video conference or the like is executed based on such an estimated value having a large difference, since the actual available bandwidth is much narrower than the assumed available bandwidth, for example, a situation in which video or the like is frequently interrupted occurs, and a satisfactory result cannot be obtained.

Alternatively, the available bandwidth may be estimated by using a packet pair disclosed in PTL 1. However, it has been determined by studies of the present inventors that, while the method based on a packet pair is suitable for estimation of the "physical bandwidth", the method is not suitable for the "available bandwidth". In accordance with the method based on a packet pair, if another packet is inserted before the first packet of the two packets of the packet pair or between the two packets during transfer of the packet pair, the estimated value obtained in this case is not an estimated value of the physical bandwidth but an estimated value of the available bandwidth.

In the method based on a packet pair, to improve the estimation accuracy, a plurality of sets of packet pairs are often transmitted at predetermined intervals, since the situation of other packets (cross traffic) often greatly varies depending on time, the obtained estimated values also greatly vary. Namely, irrespective of whether bandwidth limitation is executed, the available bandwidth estimation results obtained by the method based on packet pairs indicate large errors. Thus, normally, there is no advantage in using the method based on packet pairs in place of the method based on a packet train when estimating the available bandwidth.

A primary object of the present invention is to provide a receiver, a communication system, an available bandwidth estimation method, and a storage medium in which a program is stored, all of which contribute to accurately estimating an available bandwidth irrespective of whether bandwidth limitation is executed.

According to the present invention or a first aspect disclosed, there is provided a receiver, including: a reception part that receives a packet train(s) formed by a plurality of packets transmitted from a transmitter; a determination part that determines whether bandwidth limitation is executed in a network based on the received packet train(s); and an estimation part that selects a method for estimating an available bandwidth in the network based on whether or not the bandwidth limitation is executed and estimates the available bandwidth in the network in accordance with the selected method.

According to the present invention or a second aspect disclosed, there is provided a communication system, including: a transmitter that transmits a packet train(s) formed by a plurality of packets; and a receiver that receives the transmitted packet train(s); wherein the receiver includes: a determination part that determines whether bandwidth limitation is executed in a network based on the received packet train(s); and an estimation part that selects a method for estimating an available bandwidth in the network based on whether or not the bandwidth limitation is executed and estimates the available bandwidth in the network in accordance with the selected method.

According to the present invention or a third aspect disclosed, there is provided an available bandwidth estimation method, including: causing a receiver that receives a packet train(s) formed by a plurality of packets transmitted from a transmitter to determine whether bandwidth limitation is executed in a network based on the received packet train(s); and causing the receiver to select a method for estimating an available bandwidth in the network based on whether or not the bandwidth limitation is executed and estimate the available bandwidth in the network in accordance with the selected method.

According to the present invention or a fourth aspect disclosed, there is provided a storage medium in which a program is stored, the program causing a computer included in a receiver that receives a packet train(s) formed by a plurality of packets transmitted from a transmitter to execute processing for: determining whether bandwidth limitation is executed in a network based on the received packet train(s): and selecting a method for estimating an available bandwidth in the network based on whether or not the bandwidth limitation is executed and estimating the available bandwidth in the network in accordance with the selected method.

This program can be stored in a computer-readable storage medium. The storage medium may be a non-transient storage medium such as a semiconductor memory, a hard disk, a magnetic storage medium, or an optical storage medium. The present invention may be embodied as a computer program product.

According to the present invention or the aspects disclosed, there are provided a receiver, a communication system, an available bandwidth estimation method, and a storage medium in which a program is stored, all of which contribute to accurately estimating an available bandwidth irrespective of whether bandwidth limitation is executed.

PREFERRED MODES

Figure 1:
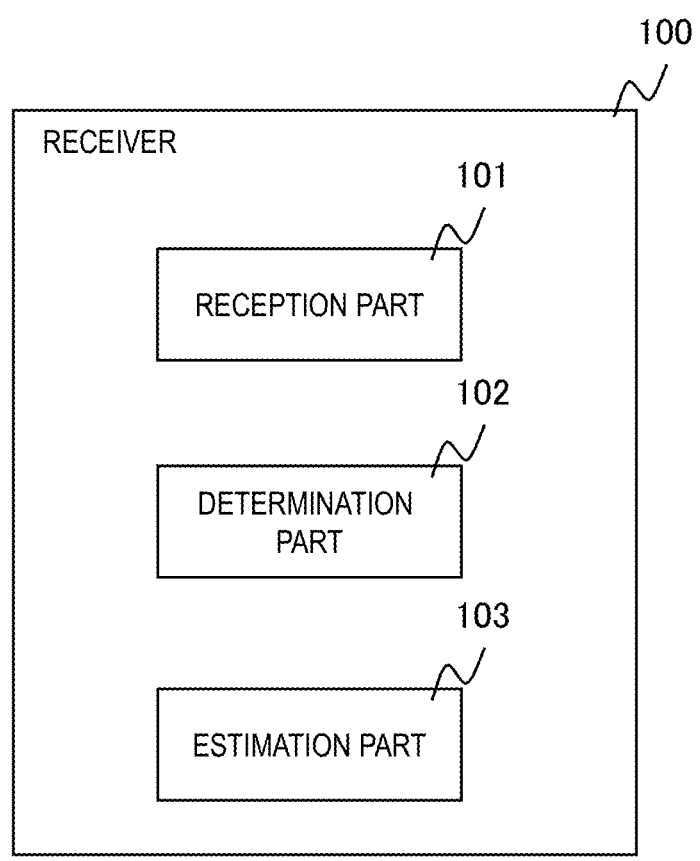
FIG. 1 illustrates an outline of an exemplary embodiment.

First, an outline of an exemplary embodiment will be described. Reference characters in the following outline denote various elements for the sake of convenience and are used as examples to facilitate understanding of the present invention. Namely, the description of the outline is not intended to indicate any limitations. An individual connection line between blocks in an individual drawing signifies both one-way and two-way directions. An arrow schematically illustrates a principal signal (data) flow and does not exclude bidirectionality. While not explicitly illustrated in the circuit diagrams, the block diagrams, the internal configuration diagrams, the connection diagrams, etc. in the disclosure of the present application, an input port and an output port exist at an input end and an output end of an individual connection line. The same holds true for the input-output interfaces.

A receiver 100 according to an exemplary embodiment includes a reception part 101, a determination part 102, and an estimation part 103 (see FIG. 1). The reception part 101 receives a packet train(s) formed by a plurality of packets transmitted from a transmitter. The determination part 102 determines whether bandwidth limitation is executed in a network based on the received packet train(s). The estimation part 103 selects a method for estimating an available bandwidth of the network based on whether or bandwidth limitation is executed and estimates the available bandwidth of the network in accordance with the selected method.

The receiver 100 determines whether bandwidth limitation is executed based on a packet train(s) transmitted from the transmitter. Next, the receiver 100 selects an available bandwidth estimation method suitable for a bandwidth limitation execution status and estimates the available bandwidth. As a result, the receiver 100 can accurately estimate the available bandwidth, irrespective of whether bandwidth limitation is executed.

Hereinafter, specific exemplary embodiments will be described in more detail with reference to drawings. In the individual exemplary embodiments, like elements are denoted by like reference characters, and description thereof will be omitted.

First Exemplary Embodiment

A first exemplary embodiment will be described in more detail with reference to drawings.

Figure 2:
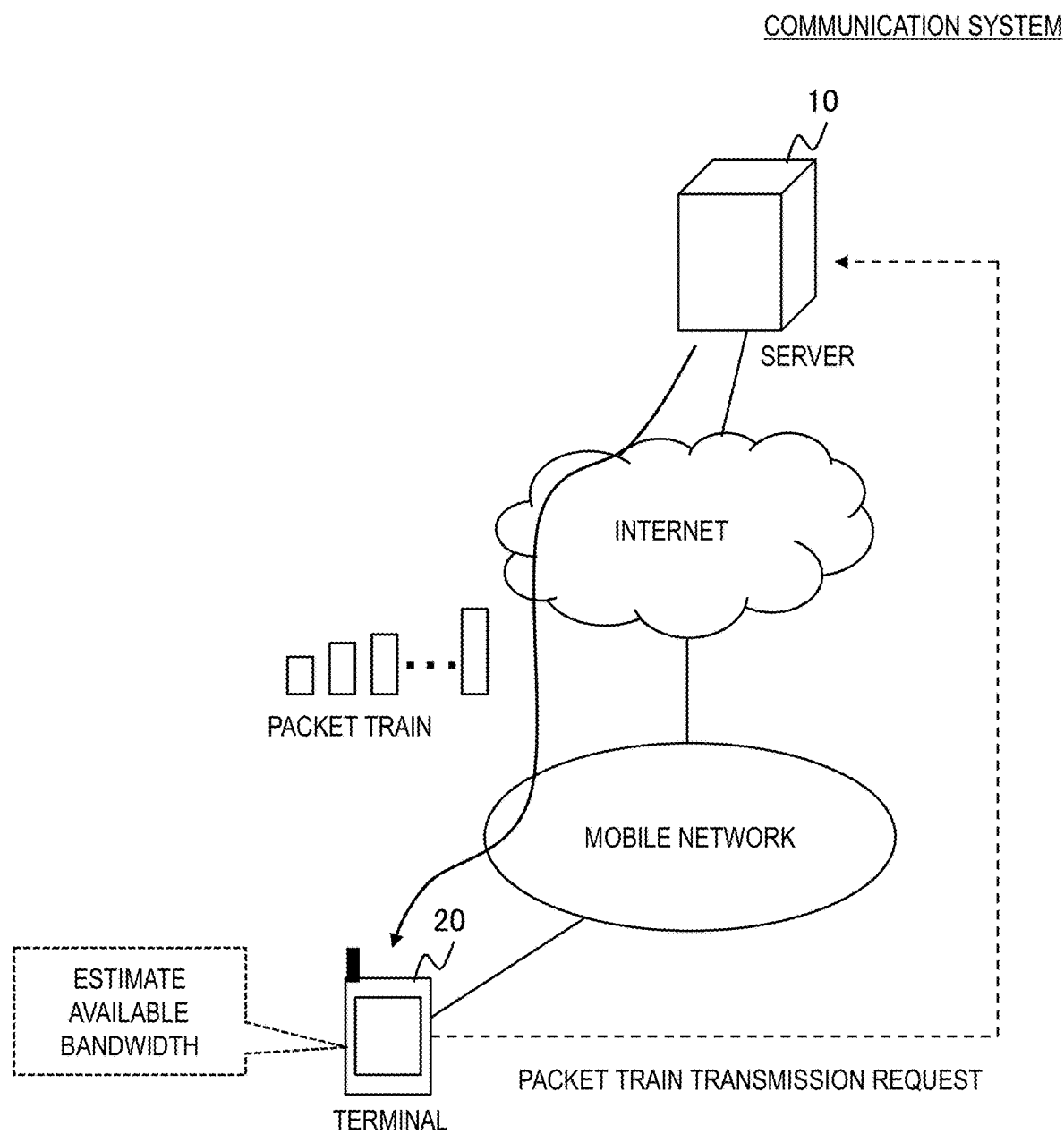
FIG. 2 illustrates an example of a schematic configuration of a communication system according to a first exemplary embodiment.

FIG. 2 illustrates an example of a schematic configuration of a communication system according to a first exemplary embodiment. As illustrated in FIG. 2, the communication system includes a server 10 and a terminal 20. The server 10 and the terminal 20 are connected to each other via the Internet and a mobile network. In the mobile network, "bandwidth limitation" is executed according to a condition(s) such as a time period(s), for example.

The server 10 is an apparatus that provides a service(s) to the terminal 20. For example, the server 10 provides a service relating to video streaming to the terminal 20.

The terminal 20 is a wireless terminal such as a mobile phone or a smartphone. The terminal 20 can access to the mobile network based on a communication method such as 3G (Third Generation) or LTE (Long Term Evolution).

[Outline of Operation]

First, an outline of an operation of the communication system according to the first exemplary embodiment will be described with reference to FIG. 2.

The terminal 20 transmits a "packet train transmission request" to the server 10. When receiving this request, the server 10 transmits a packet train formed by a plurality of packets to the terminal 20. Each of the packets forming the packet train transmitted from the server 10 serves as a packet (a measurement packet or a probe packet) for measuring the available bandwidth between the server 10 and the terminal 20.

The terminal 20 receives the above packet train transmitted. The terminal 20 determines whether bandwidth limitation is executed in the network based on the received packet train. The terminal 20 selects a method for estimating the available bandwidth in the network based on whether or bandwidth limitation is executed and estimates the available bandwidth in the network between the server 10 and the terminal 20 in accordance with the selected method. In FIG. 2, the available bandwidth of the downlink of the terminal 20 is estimated.

As described above, in the communication system according to the first exemplary embodiment, the server 10 operates as a "transmitter" that transmits a packet train, and the terminal 20 operates as a "receiver" that receives the packet train.

[Processing Configuration of Server]

Figure 3:
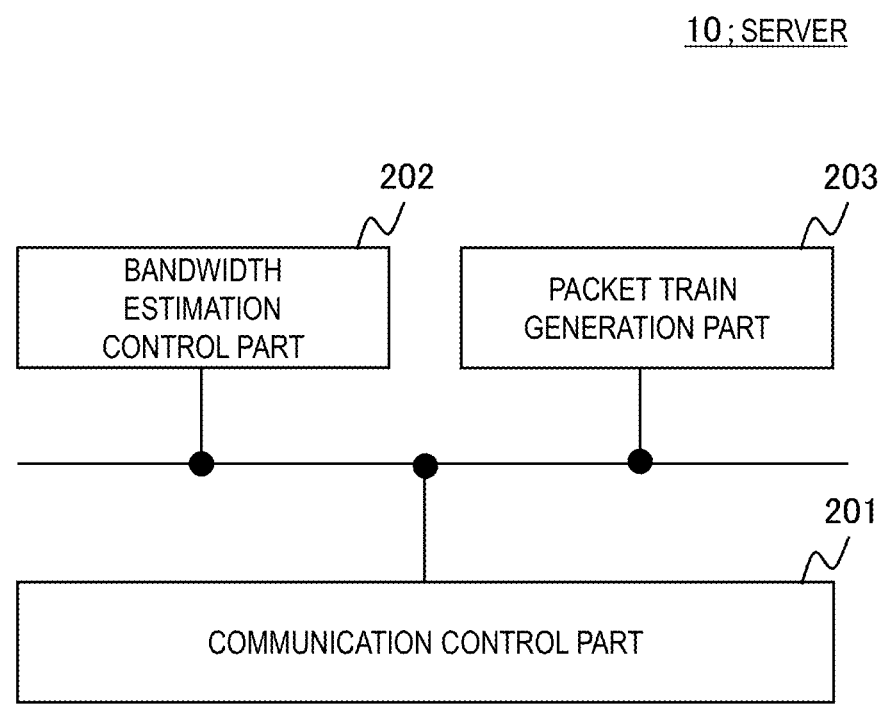
FIG. 3 illustrates an example of a processing configuration of a server according to the first exemplary embodiment.

FIG. 3 illustrates an example of a processing configuration (processing modules) of the server 10 according to the first exemplary embodiment. As illustrated in FIG. 3, the server 10 includes a communication control part 201, a bandwidth estimation control part 202, and a packet train generation part 203.

The communication control part 201 controls the communication with another apparatus (for example, the terminal 20). Specifically, the communication control part 201 transmits data (packets) acquired from other modules to another apparatus. In addition, the communication control part 201 sorts data received from another apparatus to other modules (for example, the bandwidth estimation control part 202).

The bandwidth estimation control part 202 processes the "packet train transmission request" acquired from the terminal 20. Specifically, when receiving the packet train transmission request, the bandwidth estimation control part 202 instructs the packet train generation part 203 to generate a predetermined packet train. The generated packet train is transmitted to the terminal 20 via the communication control part 201.

Figure 4:
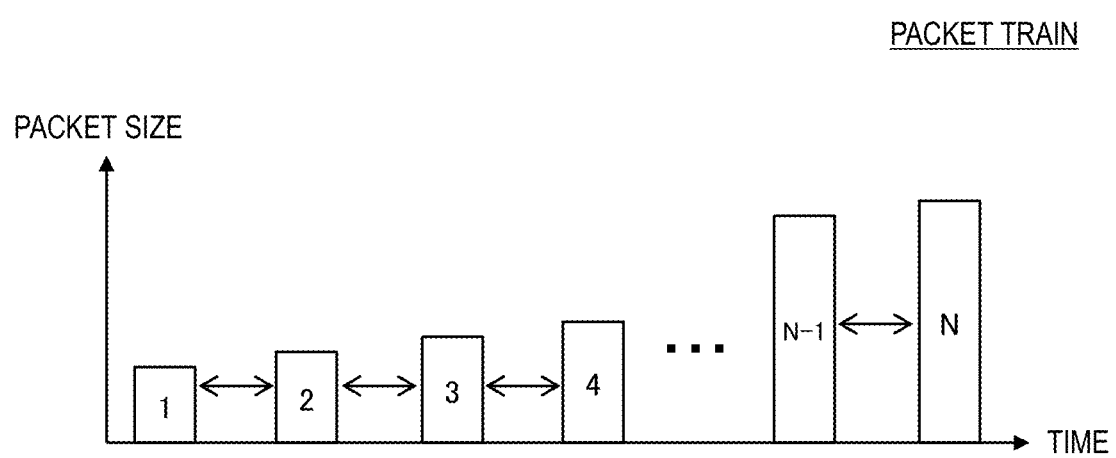
FIG. 4 illustrates a packet train generated by a packet train generation part.

The packet train generation part 203 generates a packet train disclosed in PTL 2 and outputs the generated packet train. Specifically, the packet train generation part 203 generates a plurality of packets (a packet train or a packet group) which are transmitted at regular intervals and whose packet size is gradually increased (see FIG. 4). In the example in FIG. 4, the packet train generation part 203 generates N packets (N will hereinafter represent an integer of 3 or more) each of which has a different size. In the drawings including FIG. 4, a number inside an individual packet (rectangle) represents a packet number.

The maximum packet size of these packets forming the packet train is set to be a size that does not cause fragmentation in the network. Namely, the maximum transmission unit (MTU) in the network between the server 10 and the terminal 20 is set to be the maximum size of the packets forming the packet train. The MTU in the network may be set in the server 10 in advance by a system administrator. Alternatively, the server 10 may acquire the MTU by using any one of various MTU search algorithms.

The specifications (the transmission interval, the number of packets, the sizes of the respective packets, etc.) of the packet train generated by the packet train generation part 203 may be set to values that have previously been determined between the server 10 and the terminal 20. Alternatively, the terminal 20 may notify the server 10 of the specifications. For example, the terminal 20 may add desired packet train specifications, which the terminal 20 requests the server 10 to comply with, in the packet train transmission request.

In addition, when the server 10 generates an individual packet to be included in the packet train, the packet train generation part 203 adds an ID (identifier) to the corresponding packet header or the like so that the terminal 20 can determine that this generated packet is a part of the packet train.

[Processing Configuration of Terminal]

Figure 5:
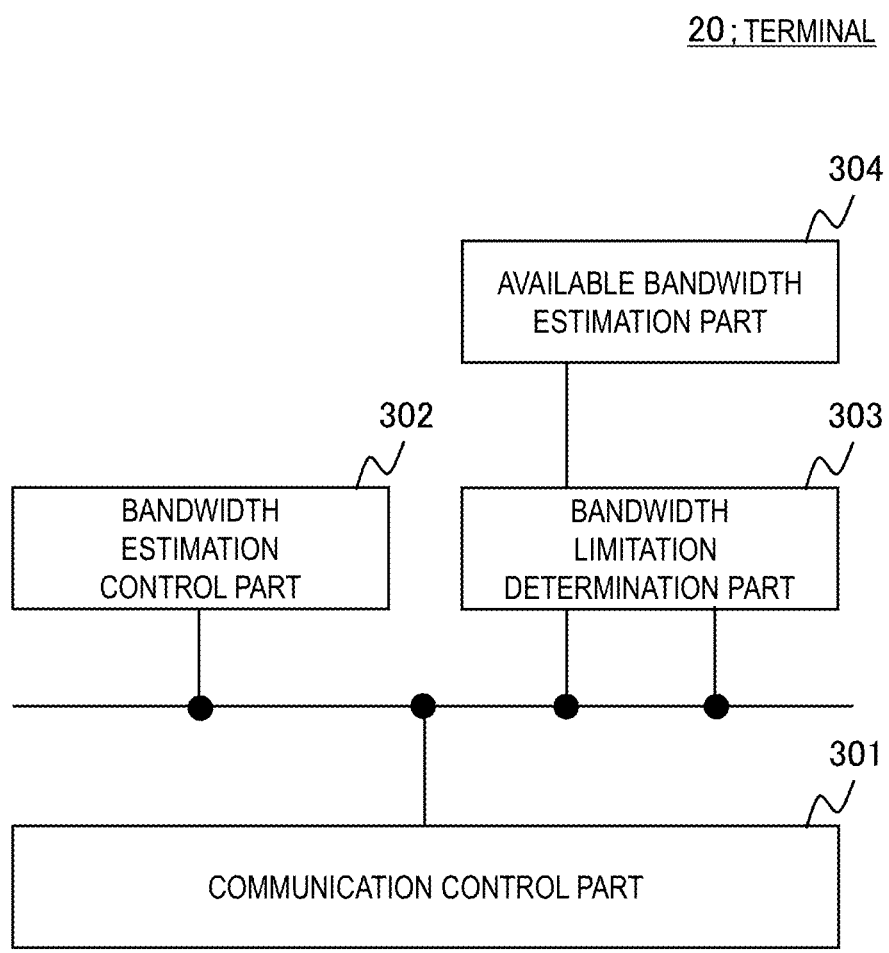
FIG. 5 illustrates an example of a processing configuration of a terminal according to the first exemplary embodiment.

FIG. 5 illustrates an example of a processing configuration (processing modules) of the terminal 20 according to the first exemplary embodiment. As illustrated in FIG. 5, the terminal 20 includes a communication control part 301, a bandwidth estimation control part 302, a bandwidth limitation determination part 303, and an available bandwidth estimation part 304.

The communication control part 301 controls the communication with another apparatus (for example, the server 10). Specifically, the communication control part 301 transmits data (packets) acquired from other modules to another apparatus. In addition, the communication control part 301 sorts data received from another apparatus to other modules (for example, the bandwidth estimation control part 302).

The bandwidth estimation control part 302 performs control processing relating to bandwidth estimation. Specifically, the bandwidth estimation control part 302 transmits a "packet train transmission request" to the server 10 in response to an instruction from an application (for example, a video streaming application) or the like installed in the terminal 20. In addition, the bandwidth estimation control part 302 supplies an estimation result (an estimation result about the downlink available bandwidth) obtained by the available bandwidth estimation part 304 to the application.

As described above, the packet train transmission request transmitted from the terminal 20 to the server 10 may include a request about the packet train specifications.

The bandwidth limitation determination part 303 determines whether bandwidth limitation is executed based on a received packet train. Specifically, the bandwidth limitation determination part 303 calculates a characteristics value about a packet(s), which has been discarded among the packets forming a transmitted packet train and determines whether bandwidth limitation is executed by performing threshold processing on the characteristics value. The bandwidth limitation determination part 303 acquires the packet train transmitted from the server 10 via the communication control part 301.

Figure 6A:
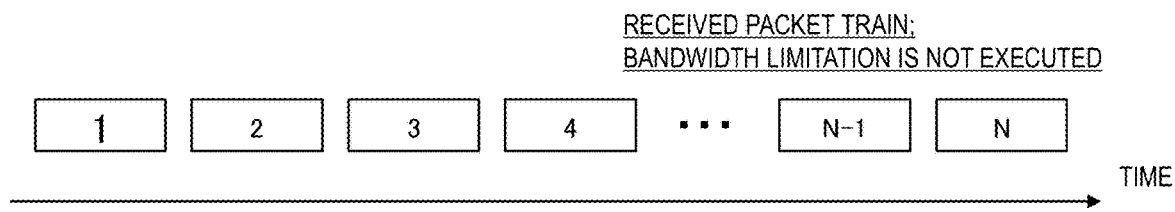
FIGS. 6A and 6B illustrate examples of a received packet train acquired by the terminal.
Figure 6B:
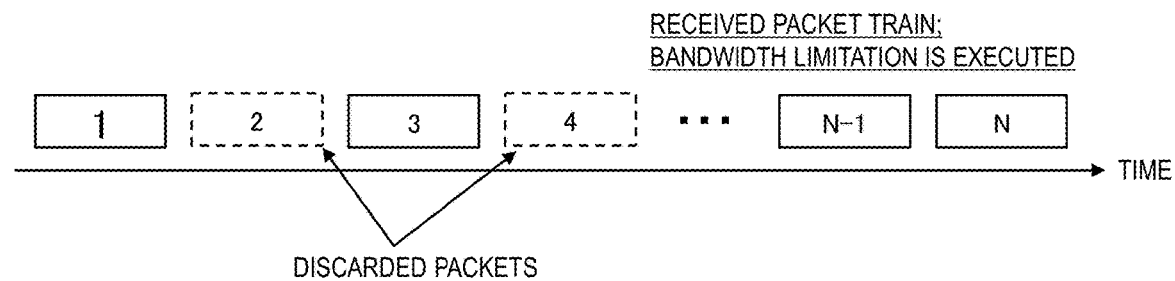

FIGS. 6A and 6B illustrate examples of a received packet train (a series of packets received) acquired by the terminal 20. FIG. 6A illustrates a received packet train when bandwidth limitation is not executed in the network between the server 10 and the terminal 20. FIG. 6B illustrates a received packet train when bandwidth limitation is executed in the network between the server 10 and the terminal 20. The size differences among the individual packets are not reflected in FIGS. 6A and 6B.

As illustrated in FIG. 6A, when bandwidth limitation is not executed, most of the packets forming the packet train transmitted from the server 10 are considered to arrive at the terminal 20. In contrast, when bandwidth limitation is executed, since packet control processing relating to shaping or policing is performed, some of the packets are discarded. As a result, some of the packets forming the packet train transmitted from the server 10 do not arrive at the terminal 20.

FIGS. 6A and 6B assume that the packets forming the packet train transmitted from the server 10 arrive at the terminal 20 in the order in which the packets are transmitted (the packet numbers are arranged in ascending order). However, in practice, these packets could arrive at the terminal 20 irrespective of the packet numbers.

The bandwidth limitation determination part 303 determines whether bandwidth limitation is executed by using the fact that some of the packets forming the packet train are discarded when bandwidth limitation is executed as illustrated in FIG. 6B. In this operation, the bandwidth limitation determination part 303 calculates a characteristics value about a packet(s), which has been discarded among the packets forming the transmitted packet train. In the following description, the characteristics value will be referred to as a "loss characteristics value" or a "packet loss characteristics value". The packet loss characteristics value is an index indicating how a packet(s) transmitted as a packet train has been discarded.

According to the first exemplary embodiment, the bandwidth limitation determination part 303 calculates the loss rate of the packets transmitted as a packet train as a "loss characteristics value". Specifically, the bandwidth limitation determination part 303 calculates, as the loss characteristics value, the rate of the total number of packets discarded among the packets transmitted as a packet train with respect to the total number of packets transmitted as the packet train. Next, the bandwidth limitation determination part 303 performs threshold processing on the calculated packet loss rate to determine whether bandwidth limitation is executed.

The bandwidth limitation determination part 303 calculates the packet loss rate by using the following expression (1).

$$\text{Packet loss rate} = \frac{NPt - NPr}{NPt} \quad (1)$$

In expression (1), NPt represents the total number of packets transmitted as a packet train. In addition. NPr represents the total number of packets received as the packet train.

In accordance with expression (1), if the terminal 20 receives all the packets (the packets forming a packet train) transmitted from the server 10, the packet loss rate is 0%. In contrast, if the terminal 20 cannot receive any of the packets transmitted from the server 10, the packet loss rate is 100%. For example, if the terminal 20 cannot receive the packets forming a packet train even after a predetermined time from transmission of a packet train transmission request to the server 10, the packet loss rate is 100%.

Figure 7:
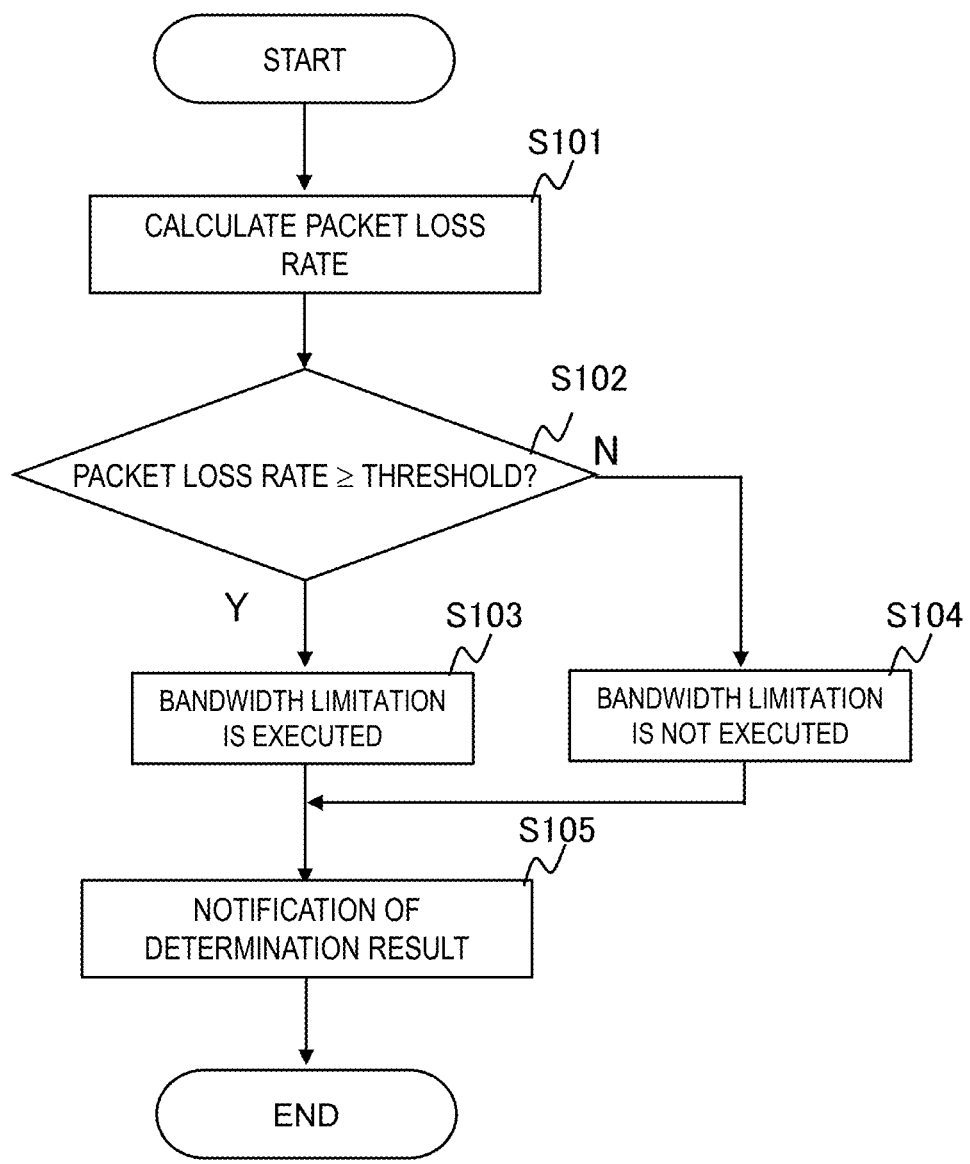
FIG. 7 is a flowchart illustrating an example of an operation of a bandwidth limitation determination part according to the first exemplary embodiment.

FIG. 7 is a flowchart illustrating an example of an operation of the bandwidth limitation determination part 303 according to the first exemplary embodiment. An operation of the bandwidth limitation determination part 303 will be described with reference to FIG. 7.

In step S101, the bandwidth limitation determination part 303 calculates the packet loss rate by using the above expression (1). Specifically, the bandwidth limitation determination part 303 calculates the above NPr by counting the packets, each of which has an identifier indicating a packet train.

To calculate the above NPt, the bandwidth limitation determination part 303 uses a number determined in advance between the server 10 and the terminal 20. Alternatively, when the number of packets forming a packet train transmitted from the server 10 to the terminal 20 is included in a packet train transmission request, the requested packet number is used as the above NPt.

The bandwidth limitation determination part 303 performs threshold processing on the calculated packet loss rate (step S102). Specifically, the bandwidth limitation determination part 303 determines whether the calculated packet loss rate is equal to or more than a threshold.

The threshold used in the threshold processing is determined as follows. First, preliminary experiment is performed in an actual environment (field), values used as candidates for the threshold are varied, and a candidate indicating a high determination accuracy is used as the threshold. For example, a system administrator or the like transmits a packet train from the server 10 to the terminal 20 in an environment in which bandwidth limitation is not executed and calculates the packet loss rate. The system administrator or the like repeats this operation. Likewise, the system administrator transmits a packet train from the server 10 to the terminal 20 in an environment in which bandwidth limitation is executed and calculates the packet loss rate. The system administrator repeats this operation. From these two kinds of packet loss rates, the packet loss rate that can determine whether bandwidth limitation is executed most accurately is set as the threshold.

If the packet loss rate is equal to or more than the threshold (Yes in step S102), the bandwidth limitation determination part 303 determines that bandwidth limitation is executed (step S103).

If the packet loss rate is less than the threshold (No in step S102), the bandwidth limitation determination part 303 determines that bandwidth limitation is not executed (step S104).

Next, the bandwidth limitation determination part 303 notifies the available bandwidth estimation part 304 of the determination result (whether bandwidth limitation is executed or not) (step S105).

The available bandwidth estimation part 304 estimates the available bandwidth in the network between the server 10 and the terminal 20. Specifically, the available bandwidth estimation part 304 estimates the above available bandwidth by using the packet train received from the server 10. In this operation, the available bandwidth estimation part 304 uses a different available bandwidth estimation method, depending on the determination result obtained by the bandwidth limitation determination part 303.

Figure 8:
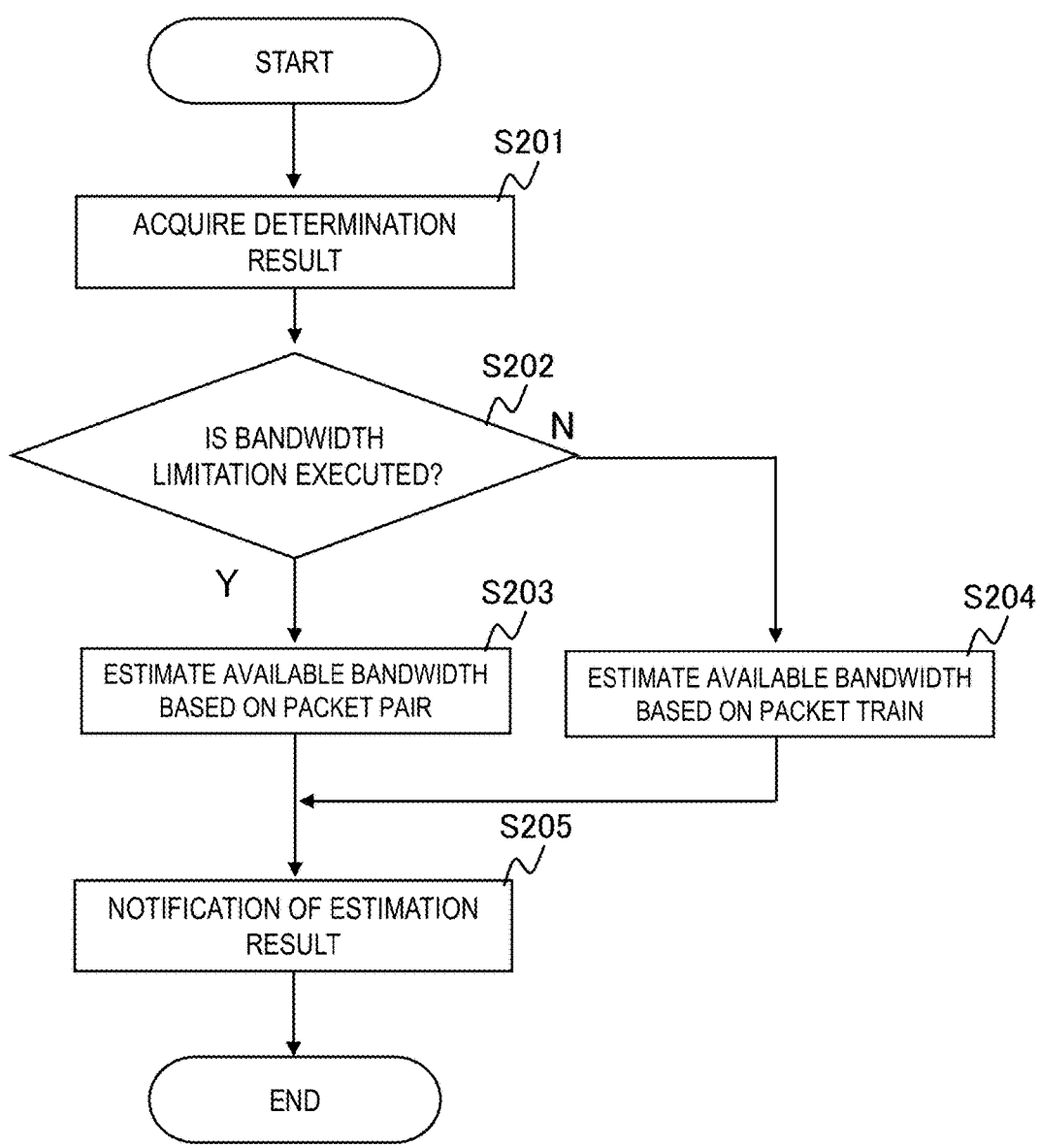
FIG. 8 is a flowchart illustrating an example of an operation of an available bandwidth estimation part according to the first exemplary embodiment.

FIG. 8 is a flowchart illustrating an example of an operation of the available bandwidth estimation part 304 according to the first exemplary embodiment.

As illustrated in FIG. 8, the available bandwidth estimation part 304 acquires the determination result obtained by the bandwidth limitation determination part 303 (step S201).

If the determination result indicates "bandwidth limitation is executed" (Yes in step S202), the available bandwidth estimation part 304 estimates the available bandwidth by applying the concept of the packet pair (step S203).

If the determination result indicates "bandwidth limitation is not executed" (No in step S202), the available bandwidth estimation part 304 estimates the available bandwidth based on the packet train (step S204).

After estimating the bandwidth, the available bandwidth estimation part 304 notifies the bandwidth estimation control part 302 of the estimation result (step S205).

Figure 9:
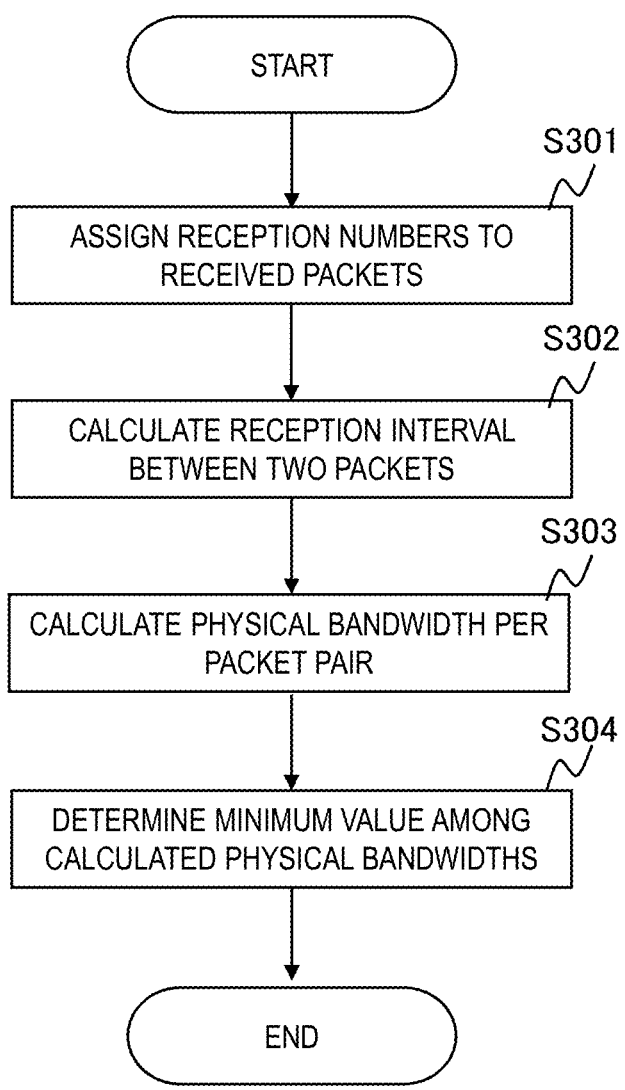
FIG. 9 is a flowchart illustrating an example of an operation of the available bandwidth estimation part performed when bandwidth limitation is executed.

Next, an available bandwidth estimation method performed when bandwidth limitation is executed (Yes in step S202 in FIG. 8) will be described in detail. FIG. 9 is a flowchart illustrating an example of an operation of the available bandwidth estimation part 304 performed when bandwidth limitation is executed.

In step S301, the available bandwidth estimation part 304 assigns reception numbers to the packets forming the packet train acquired from the server 10 in the order in which the packets have been received (in the order in which the packets have arrived at the terminal 20).

In step S302, the available bandwidth estimation part 304 calculates the reception interval between an individual packet pair while handling packets whose reception numbers are next to each other as a single packet pair. In this step, the available bandwidth estimation part 304 stores the packet sizes of the respective packets forming the individual packet pair.

In step S303, the available bandwidth estimation part 304 calculates the physical bandwidth between the server 10 and the terminal 20 per packet pair. Specifically, the available bandwidth estimation part 304 calculates the physical bandwidth per packet pair by using the following expression (2).

$$\text{Physical bandwidth} = \frac{\text{Packet size}}{\text{Reception interval}} \quad (2)$$

The packet size in expression (2) may be the packet size of one of the two packets forming an individual packet pair or an average value of the two packet sizes.

In step S304, the available bandwidth estimation part 304 determines the minimum physical bandwidth among the plurality of physical bandwidths calculated in the previous step.

Next, the available bandwidth estimation part 304 notifies the bandwidth estimation control part 302 of the determined minimum physical bandwidth as the "available bandwidth" in the network between the server 10 and the terminal 20 (step S205 in FIG. 8).

As described above, if bandwidth limitation is executed, the available bandwidth estimation part 304 generates packet pairs from the received packet train and calculates the physical bandwidth in the network based on information (the packet sizes and the reception intervals) obtained from the generated packet pairs. The calculated physical bandwidth is the estimated value of the available bandwidth in the network. More specifically, the available bandwidth estimation part 304 generates a plurality of packet pairs from the received packet train and calculates a physical bandwidth from each of the generated plurality of packet pairs. The minimum physical bandwidth among the plurality of physical bandwidths calculated is the estimated value of the available bandwidth in the network.

Figures 10A, 10B:
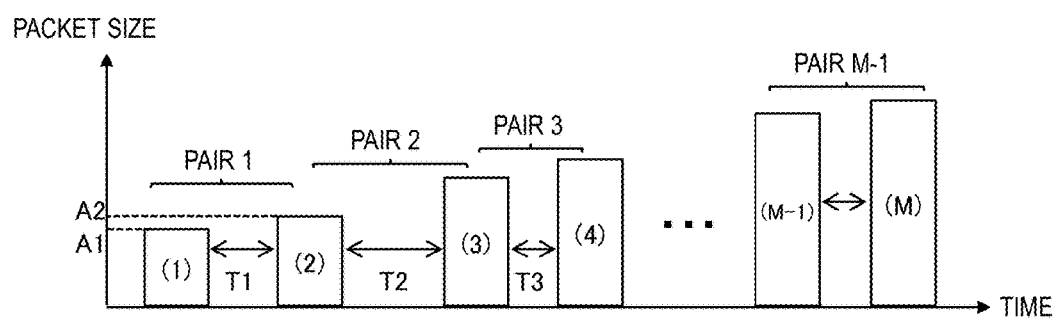
FIGS. 10A and 10B illustrate an operation of the available bandwidth estimation part according to the first exemplary embodiment.

Next, an operation of the above available bandwidth estimation part 304 will be described specifically with reference to FIGS. 10A and 10B. As illustrated in FIG. 10A, among the packets forming a packet train, the first and second packets that have arrived at the terminal 20 form a pair (packet pair) 1. Likewise, the second and third packets that have arrived at the terminal 20 form a pair 2.

In the example in FIG. 10A, among the packets forming the packet train, M packets (M is a positive integer of N or less) arrive at the terminal 20, and M−1 packet pairs are created. In FIG. 10A, the parenthesized numbers inside the packets are the reception numbers assigned in step S301.

The available bandwidth estimation part 304 calculates the reception interval of the individual packet pair (two packets whose reception numbers are next to each other). In the example in FIG. 10A, the reception interval of the pair 1 is calculated to be T1, and the reception interval of the pair 2 is calculated to be T2.

Next, the available bandwidth estimation part 304 calculates the physical bandwidths from the respective packet pairs by using expression (2). For example, when the packet size of the first one of the two packets forming a packet pair is used as the packet size, a result obtained by dividing A1 by T1 is calculated as the physical bandwidth of the pair 1.

In this way, the available bandwidth estimation part 304 calculates the physical bandwidths from the respective packet pairs (see FIG. 10B). Next, the available bandwidth estimation part 304 selects the minimum physical bandwidth among the calculated physical bandwidths and notifies the bandwidth estimation control part 302 of the minimum physical bandwidth as the estimated value of the available bandwidth in the network between the server 10 and the terminal 20.

As described above, when bandwidth limitation is executed, the available bandwidth estimation part 304 generates packet pairs from the received packet train and estimates the physical bandwidth between the server 10 and the terminal 20 from the packet pairs.

The reason why the physical bandwidth is estimated from the packet pairs is as follows. If bandwidth limitation such as shaping or policing is executed, the physical bandwidth per terminal becomes substantially equal to the available bandwidth. For example, when bandwidth limitation of 2 mbps (megabits per second) is imposed on the terminal 20 in a non-communication state, the available bandwidth for the terminal 20 is substantially equal to 2 mbps, which is the physical bandwidth. This is because, in shaping or policing, the communication bandwidth usable by the terminal is controlled to be a predetermined value (2 mbps in the above example).

Based on the assumption of the above concept, the first exemplary embodiment assumes that a received packet train is formed by many packet pairs, and the physical bandwidth is estimated by a packet pair method. The estimated physical bandwidth is considered as the available bandwidth in the downlink of the terminal 20.

In addition, according to the first exemplary embodiment, the minimum value is selected from among the plurality of physical bandwidths calculated in step S303 in FIG. 9, and the minimum value is selected as the final physical bandwidth. The above selection is performed because the physical bandwidths other than the minimum value are affected by cross traffic and is performed to exclude these physical bandwidths affected by cross traffic.

Next, the available bandwidth estimation method performed when bandwidth limitation is not executed (No in step S202 in FIG. 8) will be described. When bandwidth limitation is not executed, the available bandwidth estimation part 304 estimates the available bandwidth by using the method disclosed in PTL 2 or 3 (the method using a packet train). Thus, while not described in detail, the following operation is performed in general, to estimate the available bandwidth.

When the reception interval of any one of the received packet pairs forming a packet train has exceeded the transmission interval, the available bandwidth estimation part 304 calculates the available bandwidth by using the packet transmitted immediately before the packet pair. As described above, the server 10 gradually increases the packet size of the individual packet included in a packet train. Thus, the packet transmitted immediately before the packet pair whose reception interval is more than its transmission interval is the packet whose packet size is the largest among the packets whose reception interval and transmission interval are equal to each other.

The available bandwidth estimation part 304 calculates the available bandwidth, based on the packet size of the packet transmitted immediately before the packet pair whose reception interval has exceeded its transmission interval (this packet size will hereinafter be referred to as a delay start packet size) and the transmission interval. Specifically, the available bandwidth estimation part 304 calculates the available bandwidth by using the following expression (3).

$$\text{Available bandwidth} = \frac{\text{Delay start packet size}}{\text{Transmission interval}} \quad (3)$$

As described above, when bandwidth limitation is not executed, the available bandwidth estimation part 304 determines the first packet pair whose reception interval has exceeded its transmission interval, among the packet pairs forming the received packet train. Next, the available bandwidth estimation part 304 calculates the available bandwidth in the network, based on the packet size of the packet transmitted immediately before the determined packet pair and the transmission interval.

[Operation of Communication System]

Figure 11:
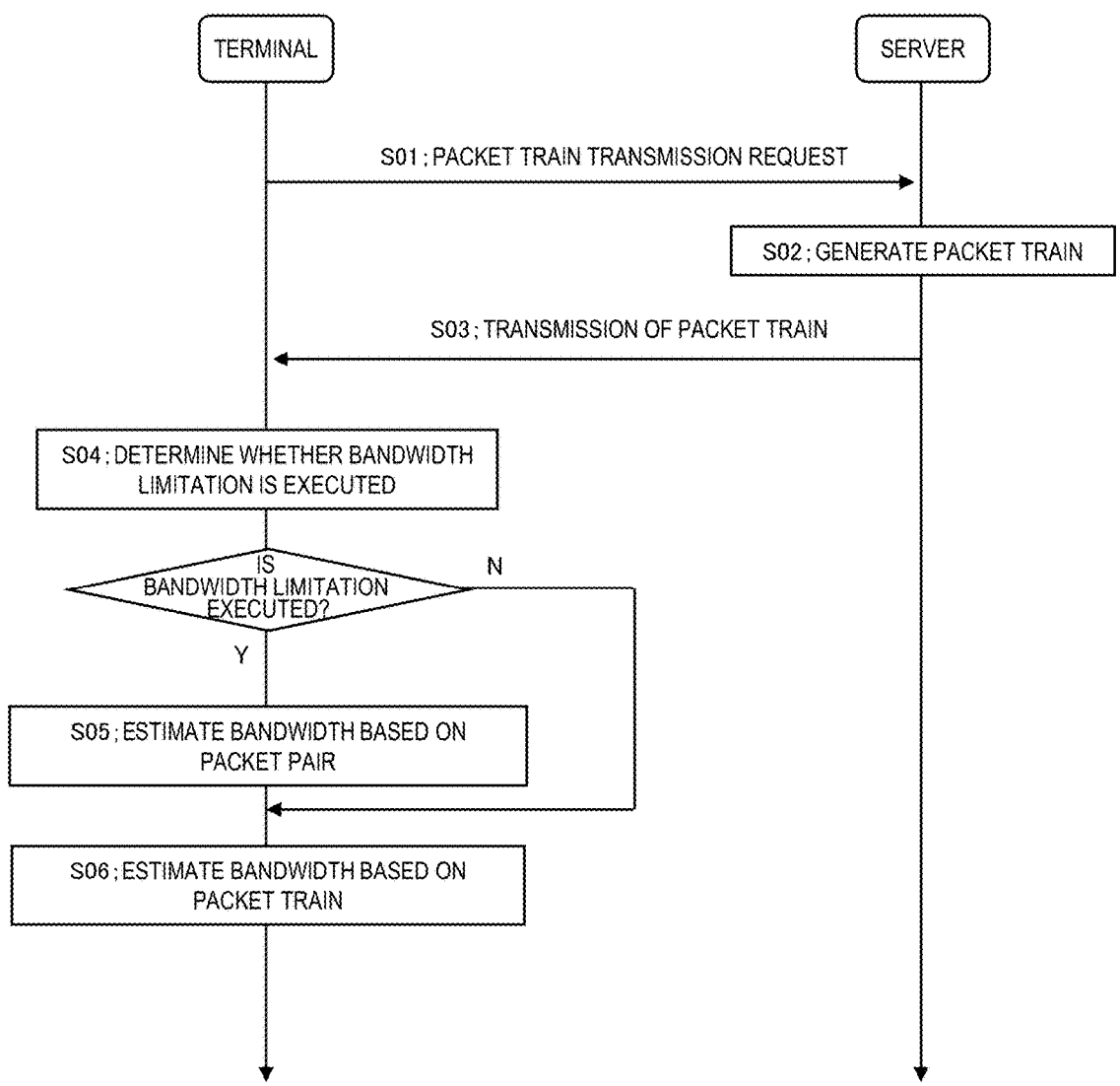
FIG. 11 is a sequence diagram illustrating an example of an operation of the communication system according to the first exemplary embodiment.

Next, an operation of the communication system according to the first exemplary embodiment will be described. FIG. 11 is a sequence diagram illustrating an example of an operation of the communication system according to the first exemplary embodiment.

First, the terminal 20 transmits a packet train transmission request to the server 10 (step S01). When receiving this request, the server 10 generates a packet train and transmits the generated packet train to the terminal 20 (steps S02 and S03). The terminal 20 receives the individual packets forming the packet train, calculates a packet loss characteristics value from the packet train, and determines whether bandwidth limitation is executed (step S04).

If bandwidth limitation is executed, the terminal 20 estimates the physical bandwidth of the downlink based on the concept of the packet pair and determines this estimated value to be the estimated value of the available bandwidth between the server 10 and the terminal 20 (step S05). If bandwidth limitation is not executed, the terminal 20 estimates the available bandwidth based on the packet train (step S06).

[Hardware Configuration]

Next, a hardware configuration of an individual apparatus included in the communication system according to the first exemplary embodiment will be described.

Figure 12:
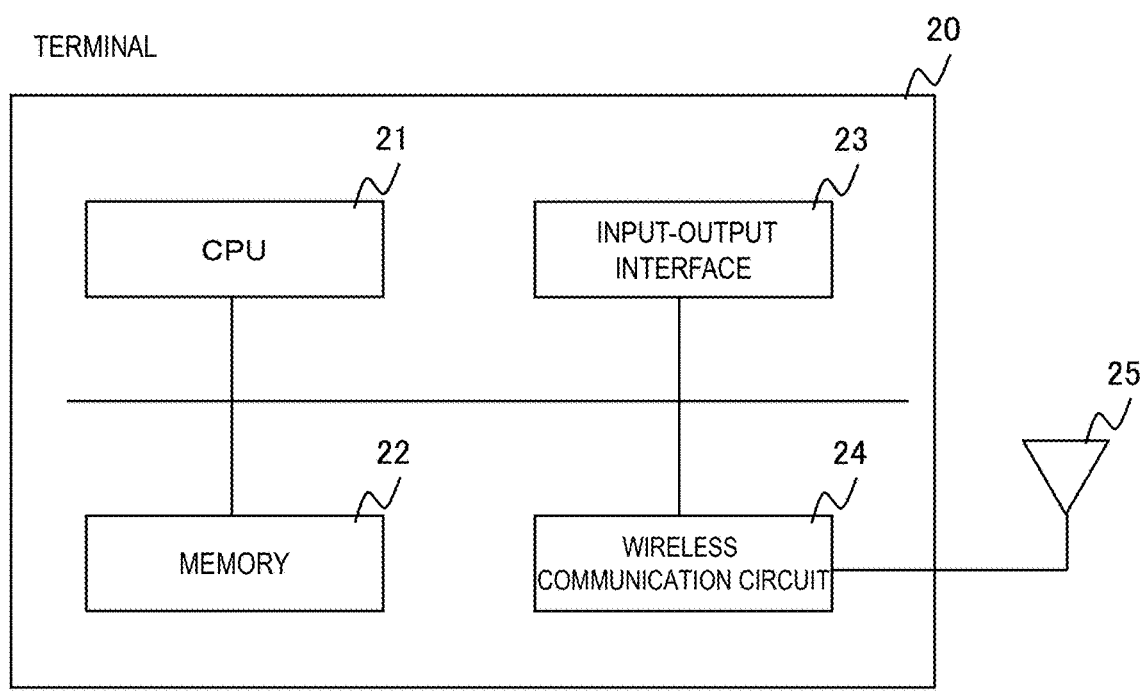
FIG. 12 illustrates an example of a hardware configuration of the terminal according to the first exemplary embodiment.

FIG. 12 illustrates an example of a hardware configuration of the terminal 20. For example, the terminal 20 includes a central processing unit (CPU) 21, a memory 22, an input-output interface 23, and a wireless communication circuit 24 that is connected to an antenna 25 and that transmits and receives radio signals, all of which are mutually connected to each other via an internal bus.

The configuration illustrated in FIG. 12 is not intended to limit the hardware configuration of the terminal 20. The terminal 20 may include hardware not illustrated. In addition, for example, the number of CPUs included in the terminal 20 is not limited to the example in FIG. 12. For example, a plurality of CPUs may be included in the terminal 20.

The memory 22 is a random access memory (RAM), a read-only memory (ROM), or an auxiliary storage device (a hard disk or the like).

Examples of the input-output interface 23 include a display device and an input device. The display device is, for example, a liquid crystal display or the like. The input device is, for example, a device such as a keyboard or a mouse that receives user operations.

The functions of the terminal 20 are realized by the above processing modules. These processing modules are realized by causing the CPU 21 to execute a program stored in the memory 22, for example. In addition, the program may be updated by downloading a program via a network or by using a storage medium in which a program is stored. The processing modules may be realized by a semiconductor chip. Namely, the functions of the above processing modules may be realized by causing some hardware to perform software.

The server 10 can be configured as a so-called information processing apparatus (a computer). For example, the server 10 can be configured by changing the communication function of the terminal 20 (by mounting a communication interface (a network interface card (NIC)) in place of the wireless communication circuit 24). Since this is apparent to those skilled in the art, description thereof will be omitted.

As described above, in the communication system according to the first exemplary embodiment, the server 10 transmits a packet train, and the terminal 20 determines whether bandwidth limitation is executed from the packets of the packet train.

Figure 13:
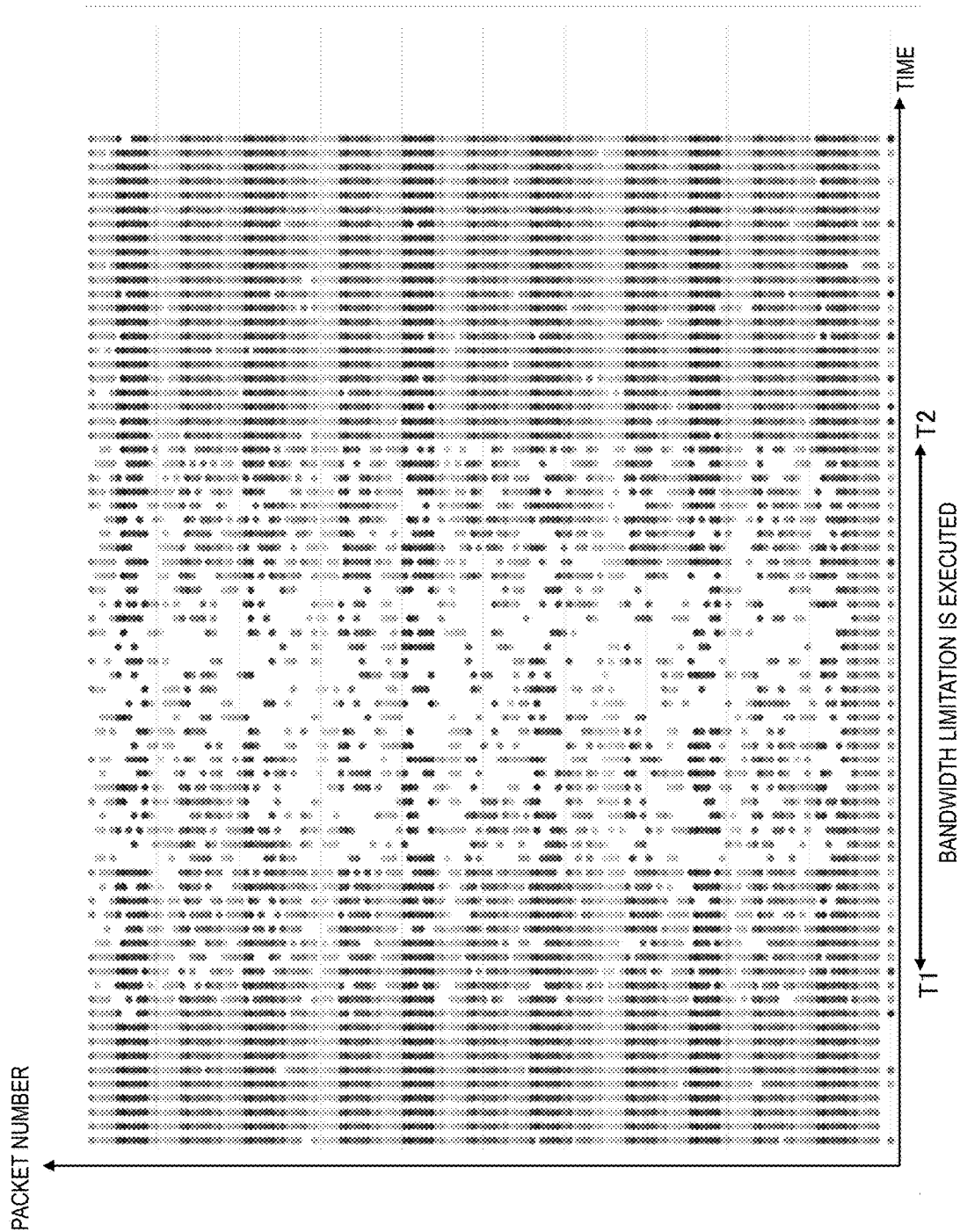
FIG. 13 illustrates reception results of packet trains in a network provided by an MVNO.

FIG. 13 illustrates reception results of packet trains in a network provided by a mobile virtual network operator (MVNO). The horizontal axis in FIG. 13 represents the transmission time of the packet trains, and the vertical axis represents the packet numbers of the packets received by the receiving-end apparatus. A plurality of packets extending in the vertical axis direction corresponds to transmission of a single packet train.

As illustrated in FIG. 13, it is seen that, before time T1 and after time T2, most of the packets transmitted as the packet trains have been received by the receiving-end apparatus. In contrast, it is seen that there are many blanks (namely, packet losses) between time T1 and T2 and that many of the packets transmitted as the packet trains have been discarded by the execution of bandwidth limitation.

Thus, there is a correlation between bandwidth limitation and packet loss. According to the first exemplary embodiment, whether bandwidth limitation is executed is determined by using the fact that the packet loss rate is high in a time period in which bandwidth limitation is executed. Namely, according to the first exemplary embodiment, a packet train, which are originally packets (a packet group) for bandwidth estimation, is used for determining whether bandwidth limitation is executed. In other words, the packet train is packets (non-inline packets) relating to bandwidth estimation and is inline packets relating to determining whether bandwidth limitation is executed. The "inline" signifies unintended use and "non-inline" signifies intended use. From this point of view, according to the first exemplary embodiment, it is fair to say that "inline measurement" using an individual packet train is performed to examine packet loss characteristics of the individual packet train and that whether bandwidth limitation is executed is determined based on the loss characteristics.

Figure 14:
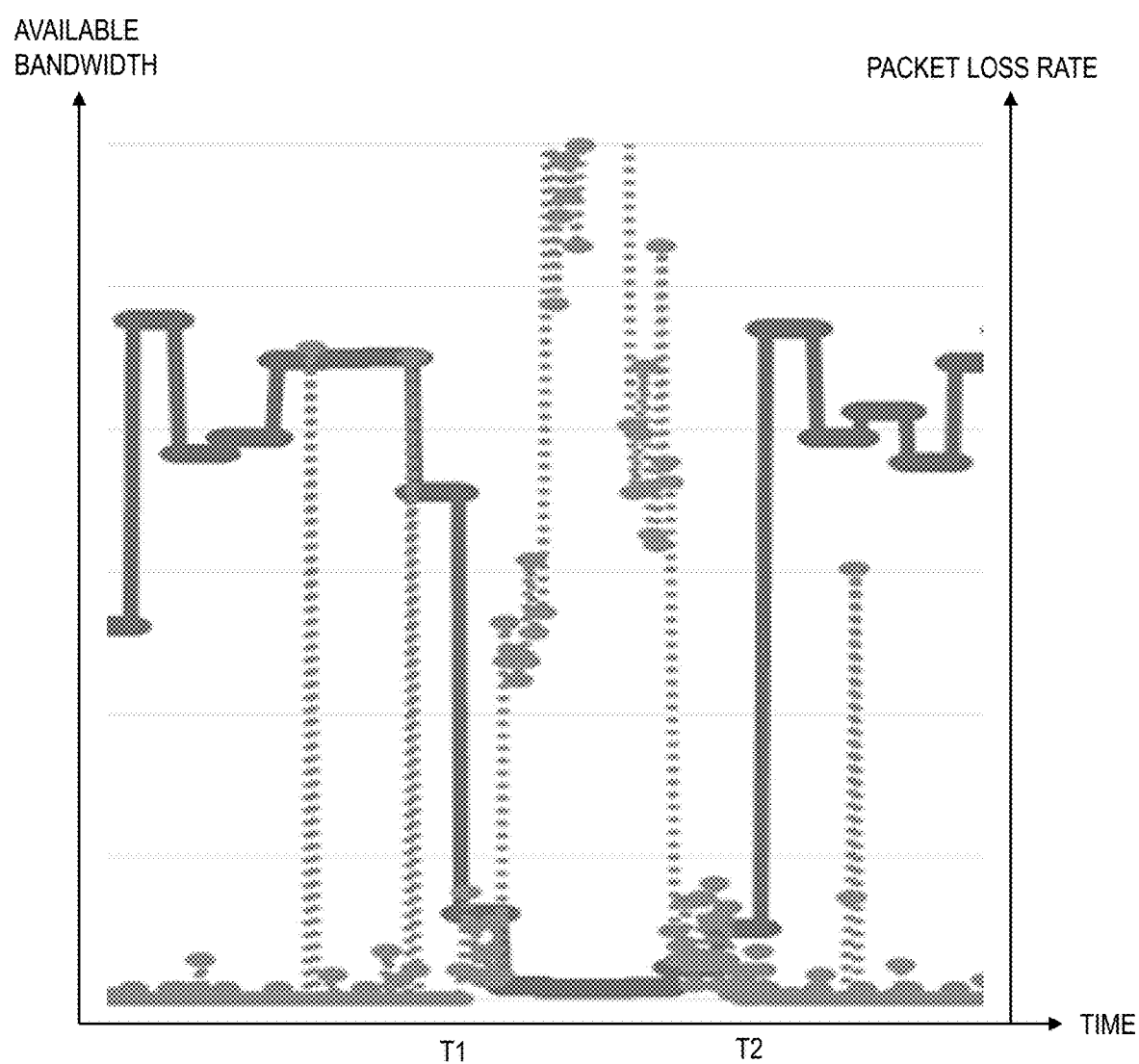
FIG. 14 illustrates a relationship between an available bandwidth and a packet loss rate.

FIG. 14 illustrates a relationship between the available bandwidth and the packet loss rate. In FIG. 14, a thick solid line represents the available bandwidth (measured values, true values) between a transmitting-end apparatus and a receiving-end apparatus, and circles with dotted lines represent the packet loss rate at various time points.

As illustrated in FIG. 14, in the period between time T1 and T2, the available bandwidth is very low, and it is estimated that bandwidth limitation is executed. In addition, in this period, the packet loss rate is much higher than that in the other periods. According to the first exemplary embodiment, such characteristics of the packet loss rate are used to determine whether bandwidth limitation is executed. In addition, if whether bandwidth limitation is executed is correctly determined, the accuracy in the estimation of the available bandwidth using this determination result is improved.

Figure 15:
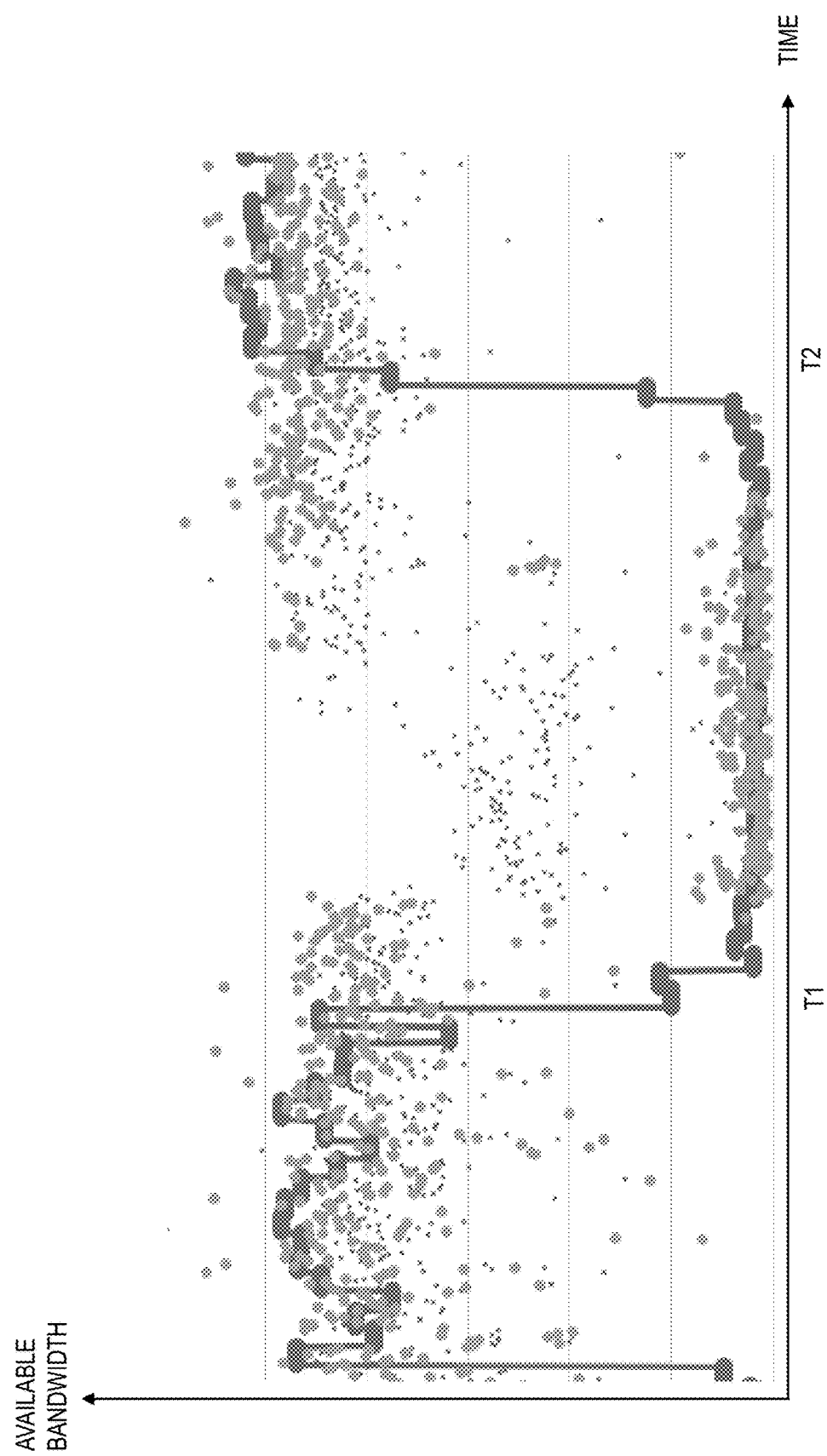
FIG. 15 illustrates an example of an available bandwidth and estimation results thereof.

FIG. 15 illustrates an example of an available bandwidth and estimation results thereof. In FIG. 15, a thick solid line represents the available bandwidth (measured values, true values) between a transmitting-end apparatus and a receiving-end apparatus. Large circles represent estimation results obtained by the technique described in the first exemplary embodiment (switching the available bandwidth estimation method depending on whether bandwidth limitation is executed). Small circles represent estimation results obtained by the technique disclosed in PTL 2 (estimating the available bandwidth based on packet trains, irrespective of whether bandwidth limitation is executed).

As illustrated in FIG. 15, in the period before time T1 and in the period after time T2, there are no significant differences between the estimation results obtained by the two techniques. This is because the available bandwidth is estimated by the same technique in these periods.

In the period between time T1 and T2, if the available bandwidth is estimated by the technique disclosed in PTL 1, the estimated values (small circles) are greatly deviated from the true values, and the available bandwidth estimation accuracy is poor. In contrast, with the technique according to the first exemplary embodiment, the estimated values (large circles) in this period substantially match the true values, and the available bandwidth is estimated accurately.

Second Exemplary Embodiment

Next, a second exemplary embodiment will be described in detail with reference to drawings.

According to the second exemplary embodiment, whether bandwidth limitation is executed is determined by a method different from that according to the first exemplary embodiment. Since a server 10 and a terminal 20 according to the second exemplary embodiment can have the same processing and hardware configurations as those according to the first exemplary embodiment, the description corresponding to FIGS. 3, 5, 12, etc. will be omitted.

A bandwidth limitation determination part according to the second exemplary embodiment operates differently from that according to the first exemplary embodiment. Hereinafter, the second exemplary embodiment will be described with a focus on an operation of a bandwidth limitation determination part 303a.

The bandwidth limitation determination part 303a calculates a data string including, as an element, the number of packets consecutively discarded among the packets forming a packet train transmitted and calculates the variance to mean ratio (VMR) of the calculated data string (vector) as a packet loss characteristics value. The bandwidth limitation determination part 303a determines whether bandwidth limitation is executed by performing threshold processing on the calculated VMR.

Figure 16:
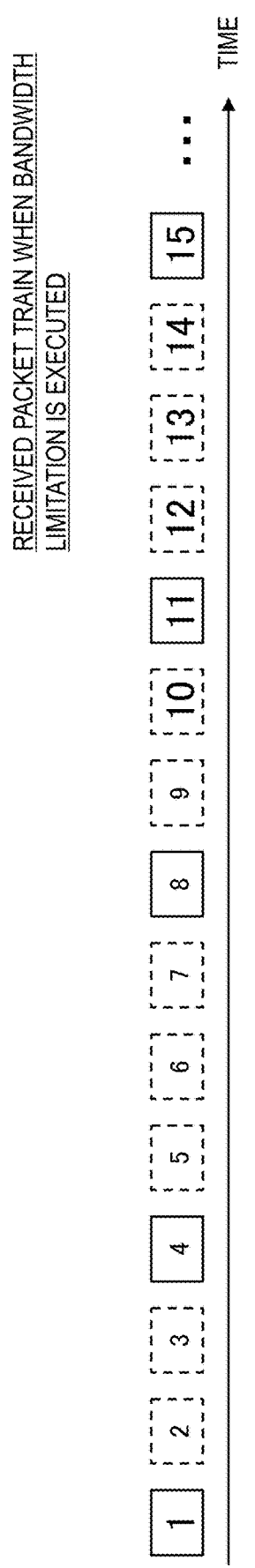
FIG. 16 illustrates an operation of a bandwidth limitation determination part according to a second exemplary embodiment.

First, based on a received packet train, the bandwidth limitation determination part 303a creates a data string including, as an element, the number of consecutively discarded packets (this number will hereinafter be referred to as the number of consecutively lost packets). The following description assumes a case in which the terminal 20 receives a packet train as illustrated in FIG. 16 in a situation where bandwidth limitation is executed.

In this case, some of the packets that form a packet train are discarded by the impact of bandwidth limitation. In the example in FIG. 16, packets having packet numbers 2, 3, 5 to 7, 9, 10, and 12 to 14 have been discarded (the packets illustrated in dotted lines are the packets discarded). The bandwidth limitation determination part 303a determines these discarded packets by checking the packet numbers assigned to the individual packets forming the packet train.

Next, the bandwidth limitation determination part 303a measures the number of consecutively discarded packets and creates a data string including the number of consecutively lost packets as an element. In the example in FIG. 16, a data string relating {2, 3, 2, 3, . . . } is created. The data string created by the bandwidth limitation determination part 303a may include "1". Namely, even when packets have not consecutively been discarded, that is, even when a single packet has been discarded, this discarded packet is reflected on the data string.

Next, the bandwidth limitation determination part 303a applies the following expression (4) to the above data string to calculate the VMR (variance to mean ratio).

$$VMR = \frac{\sigma^2}{\mu} \quad (4)$$

In expression (4), $\sigma^2$ represents the variance value and p represents the average value.

The bandwidth limitation determination part 303a determines whether bandwidth limitation is executed by performing threshold processing on the calculated VMR. The threshold used in the threshold processing can be determined by repeating preliminary experiment under an environment in which bandwidth limitation is executed, as in the first exemplary embodiment.

As described above, according to the second exemplary embodiment, whether bandwidth limitation is executed is determined by using the VMR calculated from a received packet train.

In the present exemplary embodiment, the VMR is a statistical amount indicating variability in probability distribution. As illustrated in FIG. 13, in the period (the period between time T1 and T2) in which bandwidth limitation is executed, there is great variability in the number of consecutively discarded packets. Namely, in the period in which bandwidth limitation is executed, the number of consecutively discarded packets greatly rises and drops. Thus, the period includes large and small numbers of consecutively lost packets.

This situation signifies great variability in the number of consecutively lost packets when bandwidth limitation is executed and a large VMR. According to the second exemplary embodiment, a correlation between whether bandwidth limitation is executed and the VMR to determine whether bandwidth limitation is executed.

Figure 17:
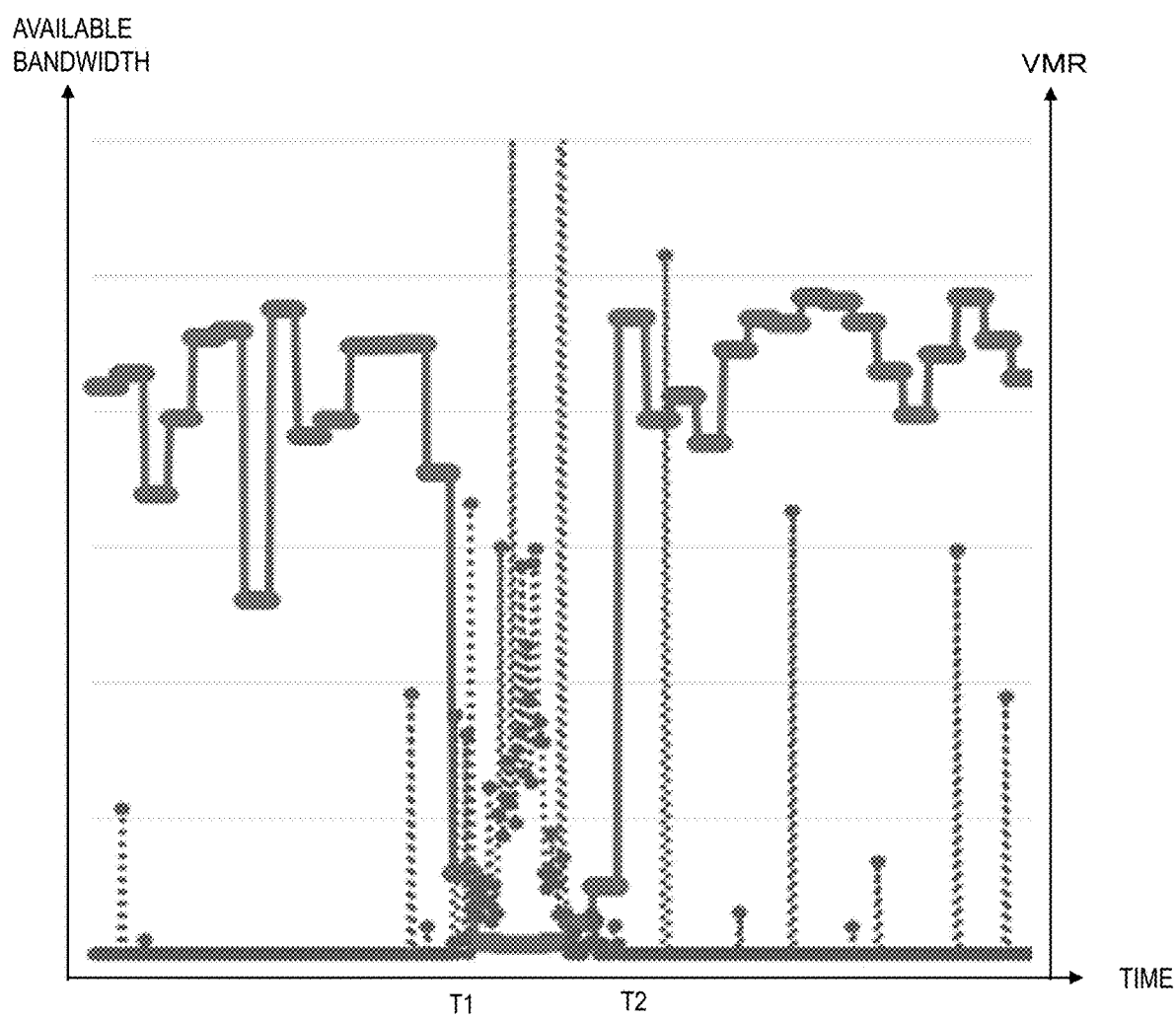
FIG. 17 illustrates a relationship between an available bandwidth and a variance to mean ratio (VMR).

FIG. 17 illustrates a relationship between the available bandwidth and the VMR. In FIG. 17, a thick solid line represents the available bandwidth (measured values, true values) between a transmitting-end apparatus and a receiving-end apparatus, and circles with dotted lines represent the VMR at various time points. As illustrated in FIG. 17, in the period between time T1 and T2, the available bandwidth is very low and it is estimated that bandwidth limitation is executed. In addition, the VMR in this period is much larger than that in the other periods.

According to the second exemplary embodiment, such characteristics of the VMR are used to determine whether bandwidth limitation is executed. In addition, if whether bandwidth limitation is executed is correctly determined, the accuracy in the estimation of the available bandwidth using this determination result is improved.

Figure 18:
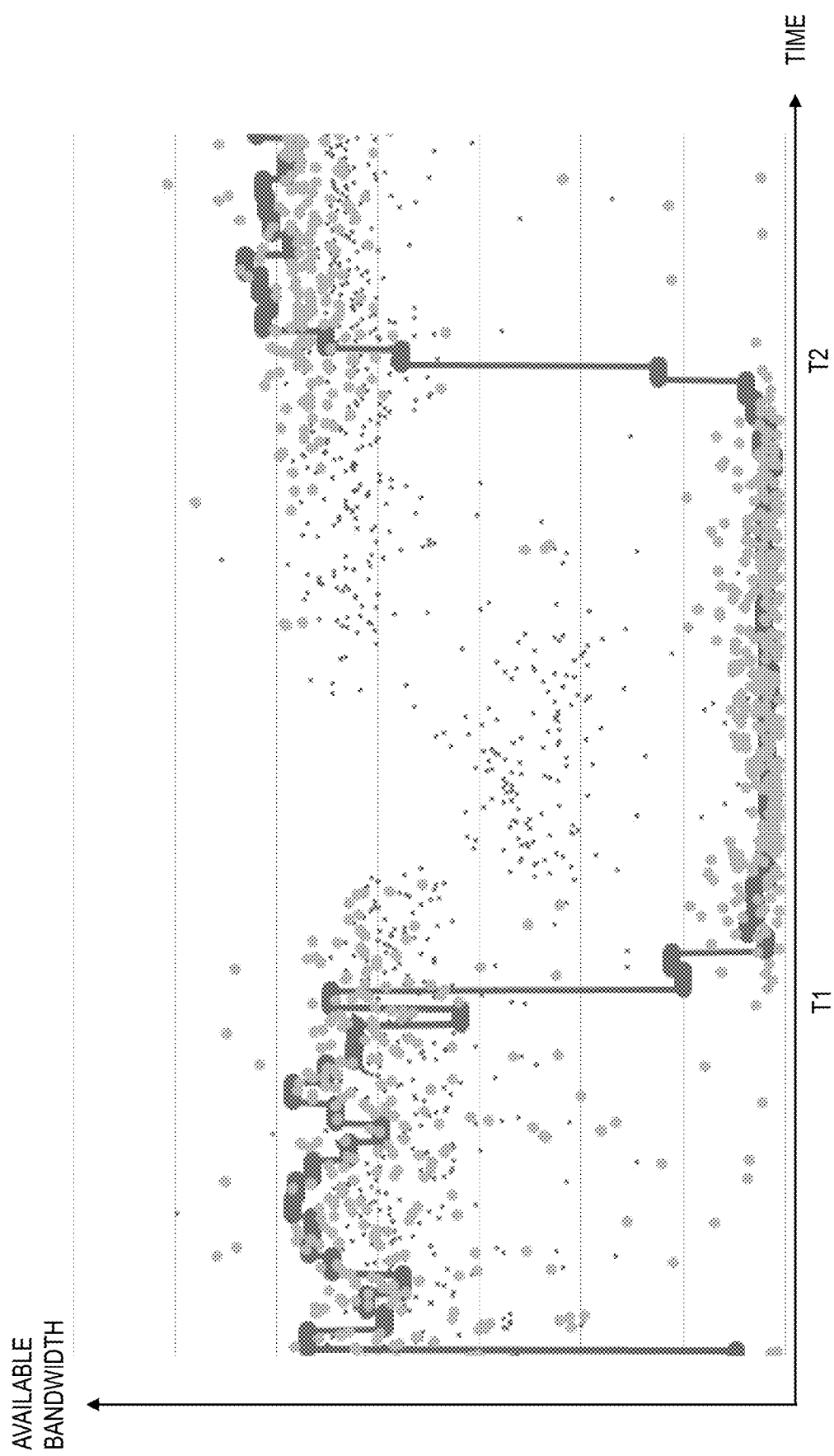
FIG. 18 illustrates an example of an available bandwidth and estimation results thereof.

FIG. 18 illustrates an example of an available bandwidth and estimation results thereof. In FIG. 18, a thick solid line represents the available bandwidth (measured values, true values) between a transmitting-end apparatus and a receiving-end apparatus. In addition, large circles represent estimation results obtained by the technique described in the second exemplary embodiment (switching the available bandwidth estimation method depending on whether bandwidth limitation is executed). Small circles represent estimation results obtained by the technique disclosed in PTL 2 (estimating the available bandwidth based on packet trains, irrespective of whether bandwidth limitation is executed).

As illustrated in FIG. 18, in accordance with the method according to the second exemplary embodiment, it is seen that whether bandwidth limitation is executed is correctly determined and that the available bandwidth is estimated accurately by using this determination result.

Third Exemplary Embodiment

Next, a third exemplary embodiment will be described in detail with reference to drawings.

In the third exemplary embodiment, a method for accurately calculating the available bandwidth when bandwidth limitation is executed will be described. Since a server 10 and a terminal 20 according to the third exemplary embodiment can have the same processing and hardware configurations as those according to the first exemplary embodiment, the description corresponding to FIGS. 3, 5, 12, etc. will be omitted.

An available bandwidth estimation part according to the third exemplary embodiment operates differently from that according to the first exemplary embodiment. The third exemplary embodiment will be described with a focus on an operation of an available bandwidth estimation part 304a according to the third exemplary embodiment.

The available bandwidth estimation part 304a calculates a plurality of packet pairs from a received packet train. Next, regarding each of the plurality of packet pairs generated, the available bandwidth estimation part 304a calculates a physical bandwidth by performing curve fitting (regression analysis) on data formed by the packet size of the individual packet pair and the reception interval between the two packets.

Figure 19:
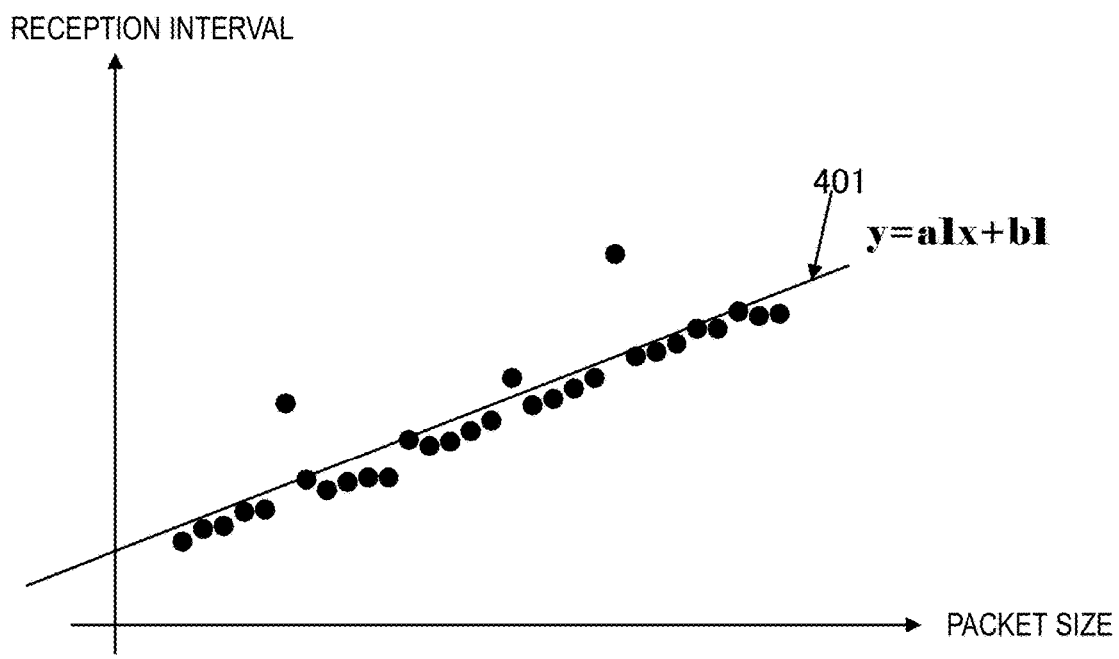
FIG. 19 illustrates an operation of an available bandwidth estimation part according to a third exemplary embodiment.

FIG. 19 illustrates a relationship between an individual packet size and the corresponding reception interval, the packet pair having been described in the first exemplary embodiment. As illustrated in FIG. 19, the reception interval of a packet pair tends to increase as the packet size of the packet pair increases. This is attributable to the fact that transmitting a large size packet to a network needs more time than transmitting a small size packet to the network.

FIG. 19 includes a few reception intervals, or points (singularities), which are very different from those of the other packet pairs. These singularities occur because the impact of cross traffic increases the reception intervals.

The available bandwidth estimation part 304a applies a least-squares method to data formed by the packet size and the reception interval per packet pair and calculates a straight line that best matches the acquired data. For example, the available bandwidth estimation part 304a calculates a straight line 401 as illustrated in FIG. 19.

The available bandwidth estimation part 304a calculates the reciprocal of the slope of the straight line calculated by the least-squares method as the physical bandwidth. In the example in FIG. 19, the reciprocal of a1 (a1 is a positive real number; the slope of the straight line 401) is the physical bandwidth in the network between the server 10 and the terminal 20 when bandwidth limitation is executed.

Alternatively, the available bandwidth estimation part 304a may estimate the available bandwidth by performing curve fitting different from the least-squares method. Such an estimated value of the physical bandwidth based on the least-squares method could include singularities due to cross traffic. In this respect, the estimate accuracy could be improved further.

The following description will be made on estimation of the available bandwidth based on curve fitting that can avoid the singularities due to cross traffic.

Figure 20:
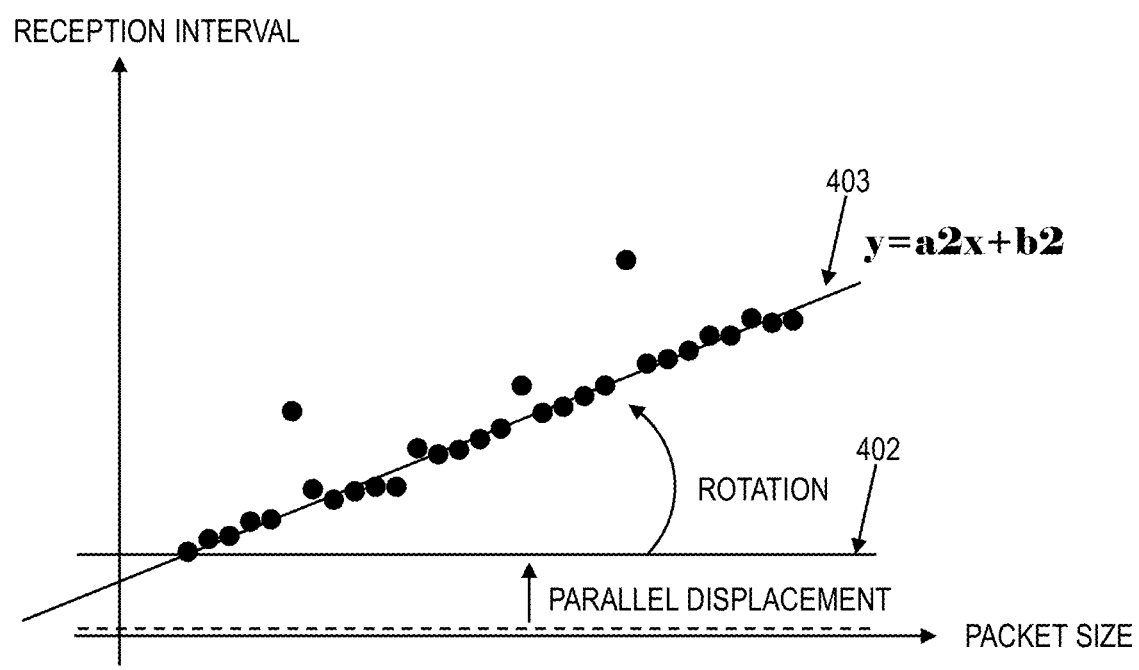
FIG. 20 illustrates an operation of the available bandwidth estimation part according to the third exemplary embodiment.

First, the available bandwidth estimation part 304a displaces a straight line without a slope (a straight line parallel to the X axis) in the positive direction along the Y axis until the straight line touches a reception interval value for the first time. For example, in the example in FIG. 20, a straight line 402 is the straight line that does not have a slope and that has touched a reception interval value for the first time. Next, the available bandwidth estimation part 304a rotates the straight line around the reception interval value that the straight line has touched and calculates a straight line that goes through most reception interval values. For example, in the example in FIG. 20, a straight line 403 is calculated as this straight line.

The available bandwidth estimation part 304a calculates the reciprocal of the slope of the calculated straight line as the physical bandwidth. In the example in FIG. 20, the reciprocal of a2 (a2 is a positive real number; the slope of the straight line 403) is the physical bandwidth in the network between the server 10 and the terminal 20 when bandwidth limitation is executed.

In this way, regarding the data formed by the packet size and reception interval of each of the plurality of packet pairs, the available bandwidth estimation part 304a sets a packet-size value to a value along the X axis and sets a reception-interval value to a value along the Y axis. Next, the available bandwidth estimation part 304a displaces a first straight line without a slope from the X axis in the positive direction along the Y axis until the first straight line reaches the minimum reception interval value. Next, the available bandwidth estimation part 304a rotates the straight line (the straight line 402 in FIG. 20) that has reached the minimum value around the minimum value in such a manner that the straight line goes through most reception interval values, so as to calculate the obtained line as a second straight line (the straight line 403 in FIG. 20). The reciprocal of the slope of the second straight line is calculated as the physical bandwidth.

According to the third exemplary embodiment, the physical bandwidth is estimated by applying curve fitting to the packet sizes and the reception intervals of the packet pairs obtained from a packet train. The physical bandwidth estimated in this way achieves better accuracy than that of an estimated value according to the first exemplary embodiment.

This is because the physical bandwidth is estimated from a plurality of sets of packet sizes and reception intervals according to the third exemplary embodiment while the physical bandwidth is estimated from a set of a packet size and a reception interval according to the first exemplary embodiment. In particular, since singularities caused by cross traffic can be avoided by displacing a straight line in parallel to the X axis and rotating the straight line, an estimated value of the physical bandwidth can be obtained more accurately.

The configurations of the communication systems and the individual apparatuses described in the first to third exemplary embodiments are examples, and therefore, the configurations of the systems, etc. are not limited to the above configurations.

Figure 21:
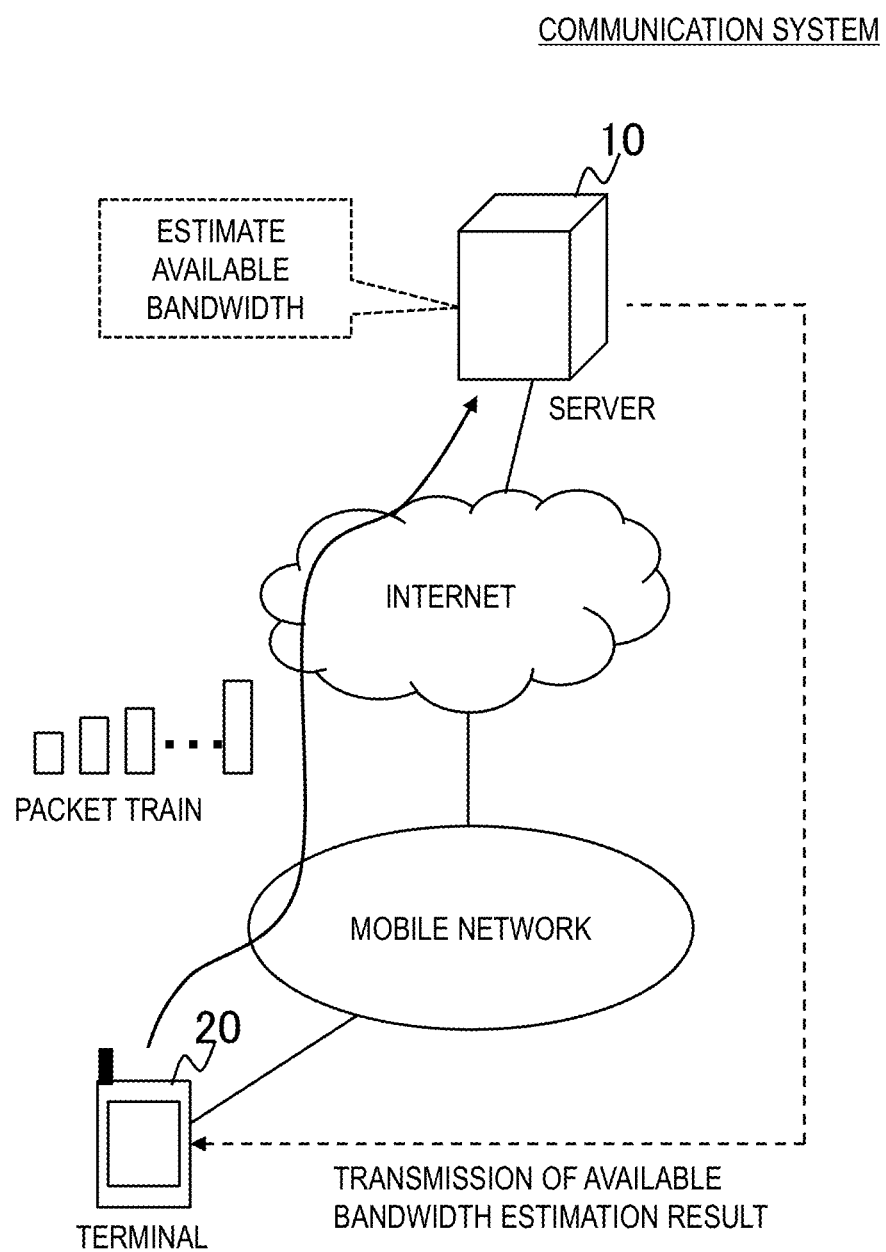
FIG. 21 illustrates another example of a schematic configuration of the communication system.

For example, while the above exemplary embodiments have been descried assuming that the downlink bandwidth of the terminal 20 is estimated, the uplink bandwidth can of course be estimated. In this case, as illustrated in FIG. 21, the terminal 20 may transmit a packet train to the server 10, and the server 10 may estimate the available bandwidth. The server 10 may notify the terminal 20 of an estimated available bandwidth. When the uplink is estimated, the terminal 20 may be implemented with a "packet train transmission function", and the server 10 may be implemented with a "bandwidth limitation determination function" and an "available bandwidth estimation function". Since these functions may be equivalent to those as described in the exemplary embodiments, further detailed description thereof will be omitted.

Figure 22A:
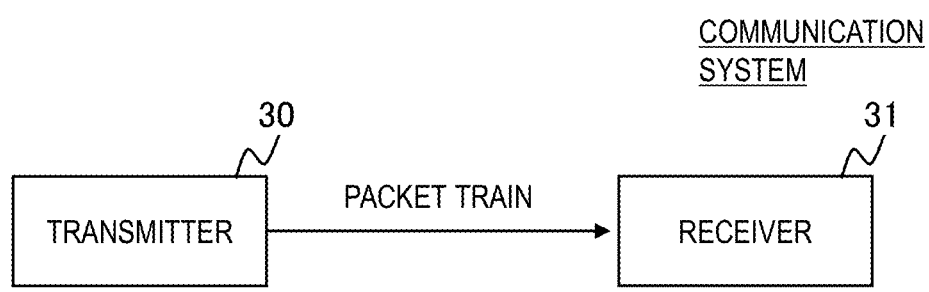
FIGS. 22A and 22B illustrate another example of a schematic configuration of the communication system.
Figure 22B:
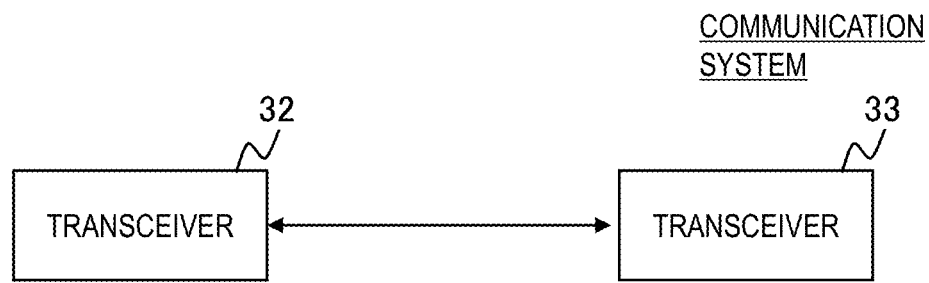

In addition, as seen from the above description, when the downlink available bandwidth of the terminal 20 is estimated, the terminal 20 serves as a "receiver" and the server 10 serves as a "transmitter". In contrast, when the uplink available bandwidth is estimated, the terminal 20 serves as a "transmitter", and the server 10 serves as a "receiver". Namely, as illustrated in FIG. 22A, the communication system includes a transmitter 30 and a receiver 31. When the available bandwidths of the uplink and downlink of the terminal 20 are estimated, the server 10 and the terminal 20 serve as a transceiver 32 and a transceiver 33, respectively (see FIG. 22B).

While FIG. 2 illustrates a configuration in which the terminal 20 is connected to a mobile network via a wireless communication method, the terminal 20 may be connected to the Internet via wired connection without a mobile network. For example, the terminal 20 may be an apparatus such as a personal computer and may be connected to the Internet via an optical network unit (ONU), for example. In this case, while bandwidth limitation could be executed by an Internet provider, the communication system disclosed in the present application enables determination of whether bandwidth limitation is executed even in such case.

While FIG. 2 illustrates an example of a server-client system including the server 10 and the terminal 20, the apparatuses included in the communication system are not limited to a combination of a terminal and a server. For example, when a video conference is performed between a plurality of terminals, the available bandwidth estimation technique disclosed in the present application may be used.

Figure 23:
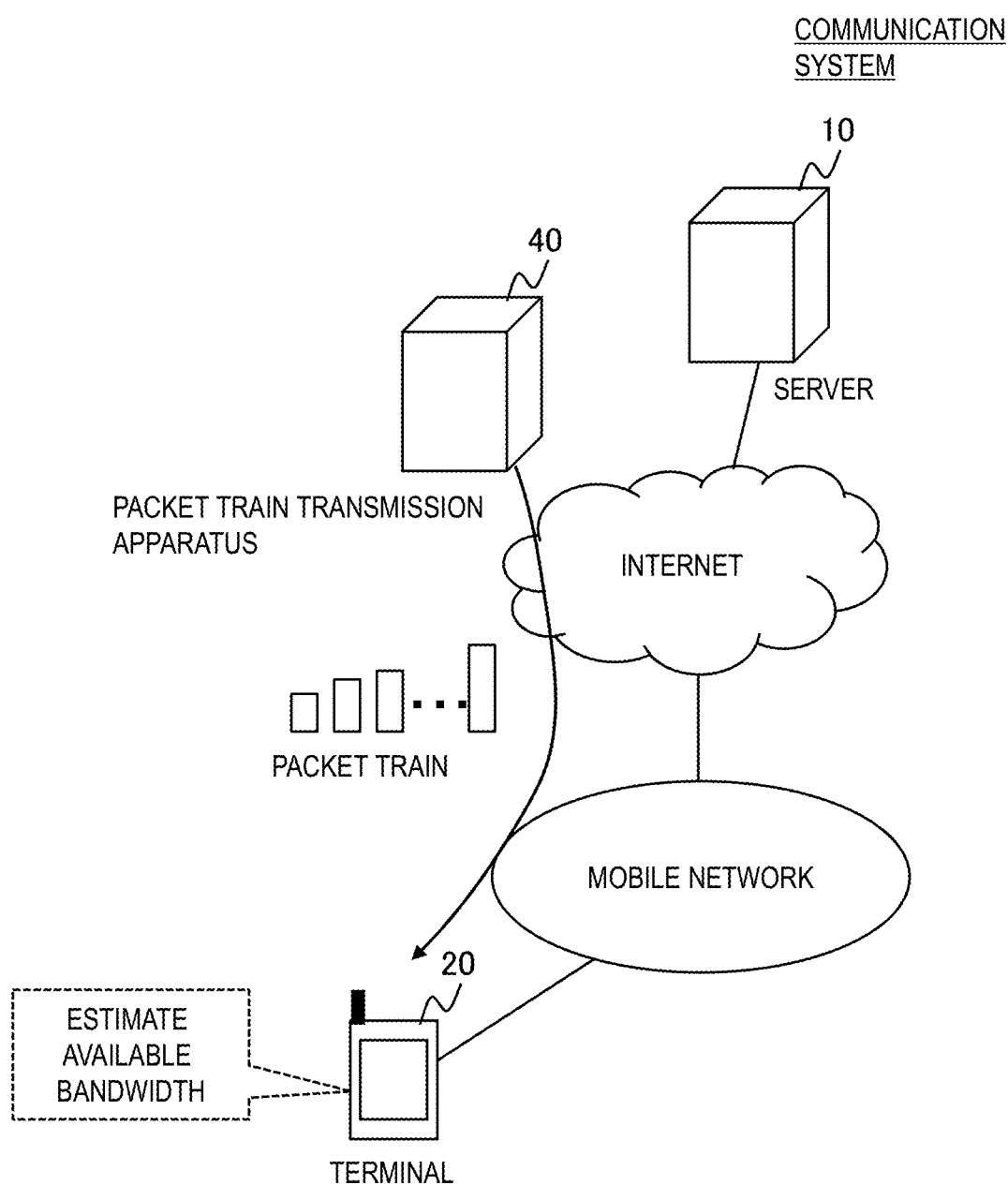
FIG. 23 illustrates another example of a schematic configuration of the communication system.
Figure 24:
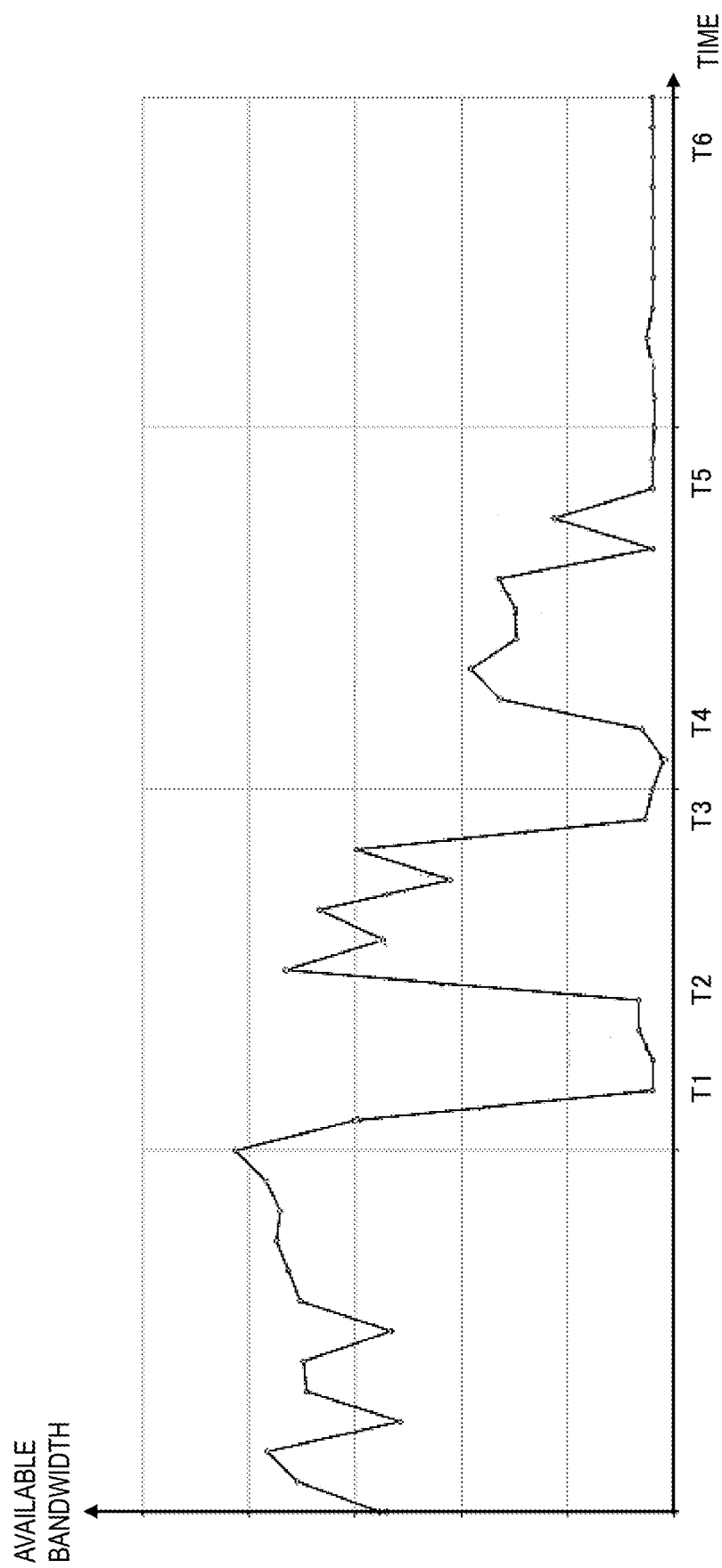
FIG. 24 illustrates an example of results obtained by measuring a communication bandwidth of an MVNO.
Figure 25:
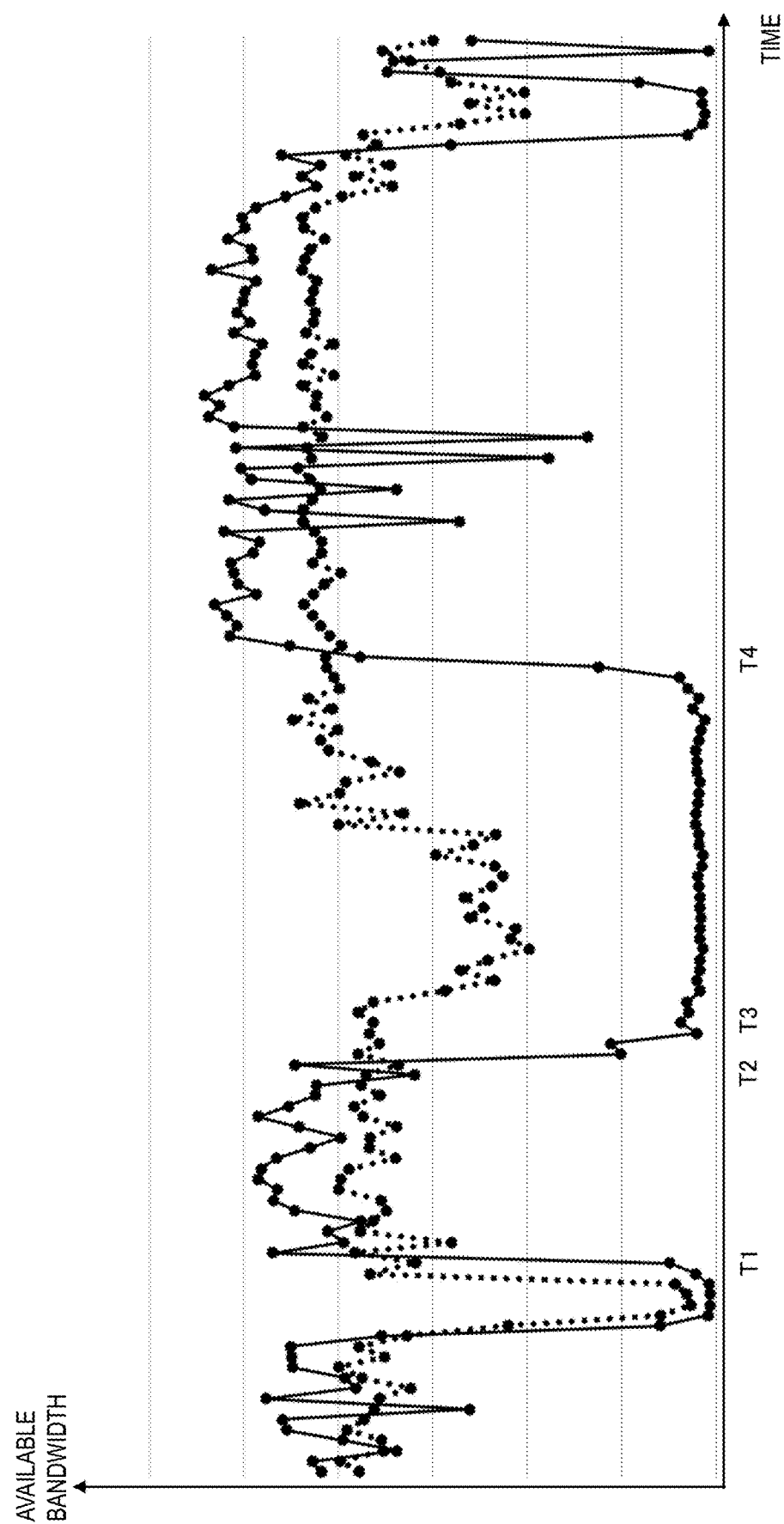
FIG. 25 illustrates an example of results obtained by estimating the available bandwidth of a communication by an MVNO.

While the above exemplary embodiments assume that the server 10 is an apparatus that provides a service(s) to the terminal 20, the available bandwidth may be estimated by using an apparatus that does not provide a service(s). For example, as illustrated in FIG. 23, a packet train transmission apparatus 40 may be installed on the Internet, and a packet train may be transmitted from this apparatus to the terminal 20. Normally, when the bandwidth in a wireless section (a mobile network) and the bandwidth in a wired section (the Internet) are compared with each other, it is often the case that the bandwidth in the wireless section is narrower. Under this premise (situation), even when a packet train is transmitted from either the server 10 or the packet train transmission apparatus 40 in FIG. 23, since the packet train travels through the wireless section, substantially the same available bandwidth estimated values are obtained. Likewise, when the available bandwidth of the uplink of the terminal 20 is estimated, an "available bandwidth estimation apparatus" may of course be installed on the Internet.

The above exemplary embodiments assume a case in which a packet train whose packet size gradually increases with time is transmitted and received. However, a packet train whose packet size gradually decreases with time may be transmitted and received.

While the above exemplary embodiments assume a case in which a packet train disclosed in PTL 2 or 3 is transmitted and received, a packet train whose specifications are different from those of the packet train disclosed in the above literature may be transmitted and received. For example, a packet train of a technique referred to as "PathChirp" disclosed in NPL 1 of PTL 2 may be transmitted. In this case, a plurality of packets that have a certain packet size and that are transmitted at variable intervals are transmitted and received. Alternatively, a packet train formed by individual packets having the same packet size and the same transmission interval may be transmitted and received. Namely, any packet train (a plurality of packets) may be transmitted and received as long as a receiver can measure the granularity of the received packets depending on whether bandwidth limitation is executed.

However, arbitrary packet trains as described above can be transmitted and received only from the viewpoint of the determination of whether bandwidth limitation is executed. If the final estimation of the available bandwidth is also considered, transmission and reception of packet trains disclosed in PTL 2 or 3 has more advantages. This is because the available bandwidth estimation techniques disclosed in PTLs 2 and 3 solve the problems such as the above PathChirp, etc. Thus, even if packet trains such as PathChirp are transmitted and received to determine whether bandwidth limitation is executed, when the available bandwidth is estimated later, transmission and reception of packet trains disclosed in PTL 2 or 3 may be needed.

In the above exemplary embodiments, while whether bandwidth limitation is executed is determined by performing threshold processing on a loss characteristics value such as the packet loss rate or the variance to mean ratio of the number of consecutively lost packets, whether bandwidth limitation is executed may be determined by a different technique. For example, image data that visualizes the reception status of an individual received packet train may be prepared, and whether bandwidth limitation is executed may be determined by performing machine learning (for example, deep learning) or the like using the image data. For example, in an environment in which whether bandwidth limitation is executed is previously determined, image data (for example, the image data prior to time T1 in FIG. 13) that visualizes received packet trains in a situation in which bandwidth limitation is not executed is acquired a plurality of times. Likewise, data (for example, the image data between time T1 and T2 in FIG. 13) that visualizes received packet trains in a situation in which bandwidth limitation is executed is acquired a plurality of times. A learning model may be formed by using, as training data, these two kinds of image data acquired, and image data used as the bandwidth limitation determination target may be entered to the obtained learning model. Namely, the determination of whether bandwidth limitation is executed in a network based on an individual received packet train is not limited to threshold processing using a loss characteristics value.

The above exemplary embodiments assume a case in which a threshold, which is used to determine whether bandwidth limitation is executed, is determined through preliminary experiment and this threshold is used fixedly. However, the threshold used may be changed depending on various conditions, for example. For example, if it has been determined by preliminary experiment that the optimum threshold differs depending on the time period, a threshold may be prepared per time period, and threshold processing may be performed by selecting a threshold depending on the time period for which whether bandwidth limitation is executed is determined.

In the above exemplary embodiment, whether bandwidth limitation is executed is determined and the available bandwidth is estimated by transmission and reception of a single packet train. However, the determination and estimation may be performed by transmission and reception of a plurality of packet trains. For example, as illustrated in FIG. 14, in a time period in which bandwidth limitation is not probably executed (for example, prior to time T1), there are time points at which the packet loss rate is significantly high. If threshold determination is performed on these values, an erroneous determination could occur depending on the selection of the threshold. To prevent such erroneous determination, a plurality of packet trains may be transmitted and received, and if the same determination is obtained a predetermined number of times or more, the determination result (whether bandwidth limitation is executed or not) may be determined. Alternatively, an odd number of packet trains may be transmitted and received, and a determination result may be determined by a majority vote.

Alternatively, specifications of packet trains transmitted and received may be changed depending on conditions such as time periods, etc. For example, the total number of packets forming a packet train transmitted and received in an early-morning time period may be different from the total number of packets forming a packet train transmitted and received during the day. Alternatively, the technique for determining whether bandwidth limitation is executed may be switched depending on a condition such as a time period or the like. For example, the technique may be switched so that the determination is performed by using the packet loss rate described in the first exemplary embodiment in an early-morning time period and the determination is performed by using the VMR of the number of consecutively lost packets described in the second exemplary embodiment in a time period during the day.

The processing configurations of the server 10 and the terminal 20 illustrated in FIGS. 3 and 5 are examples, and therefore, the configurations of the server 10 and the terminal 20 are not of course limited to these examples. For example, the communication control part 201 illustrated in FIG. 3 may generate and transmit packet trains.

While a plurality of steps (processing) are sequentially described in the plurality of flowcharts used in the above description, the execution orders of the steps executed in the individual exemplary embodiments are not limited to the sequences described. In the individual exemplary embodiments, the orders of steps illustrated may be changed as long as the change does not cause problems in term of content. For example, a plurality of processing may be executed in parallel. The individual exemplary embodiment described above may be combined as long as the combination does not cause contradiction in terms of content.

By installing an available bandwidth estimation program in a storage part of a computer, the computer can serve as an available bandwidth estimation apparatus. In addition, by causing a computer to execute an available bandwidth estimation program, the computer can execute an available bandwidth estimation method.

The above exemplary embodiments can partially or entirely be described (but not limited to) as the following notes.

[Note 1]

See the receiver according to the above first aspect.

[Note 2]

The receiver according to note 1;

wherein the determination part calculates a characteristics value(s) about a packet(s) discarded among the packets forming the transmitted packet train(s); and wherein the determination part determines whether the bandwidth limitation is executed by performing threshold processing on the characteristics value(s).

[Note 3]

The receiver according to note 2; wherein the determination part calculates a ratio(s) of a total number of packets discarded among the packets transmitted as the packet train(s) with respect to a total number of packets transmitted as the packet train(s) as the characteristics value(s).

[Note 4]

The receiver according to note 2; wherein the determination part calculates a data string(s) including, as an element(s), the number of consecutively discarded packets among the packets forming the transmitted packet train(s) and calculates a variance to mean ratio(s) of the calculated data string(s) as the characteristics value(s).

[Note 5]

The receiver according to any one of notes 1 to 4; wherein, when the bandwidth limitation is executed, the estimation part generates a packet pair from the individual packet train received, calculates a physical bandwidth in the network based on information obtained from the generated packet pair, and determines the calculated physical bandwidth to be an estimated value of the available bandwidth in the network.

[Note 6]

The receiver according to note 5; wherein the estimation part calculates the physical bandwidth based on a packet size(s) of at least one of the two packets of the packet pair and a reception interval between the two packets forming the packet pair.

[Note 7]

The receiver according to note 5 or 6; wherein the estimation part generates a plurality of packet pairs from the individual packet train received, calculates a physical bandwidth from each of the generated plurality of packet pairs, and determines a minimum physical bandwidth of the plurality of physical bandwidths calculated to be an estimated value of the available bandwidth in the network.

[Note 8]

The receiver according to note 5; wherein the estimation part generates a plurality of packet pairs from the individual packet train received and calculates, regarding each of the plurality of packet pairs generated, the physical bandwidth by performing curve fitting on data formed by a packet size(s) of at least one of the two packets forming the packet pair and an reception interval between the two packets forming the packet pair.

[Note 9]

The receiver according to note 8; wherein the estimation part calculates a reciprocal of a slope of a straight line obtained by applying a least-squares method to the data including the packet sizes and the reception intervals as the physical bandwidth.

[Note 10]

The receiver according to note 8;

wherein, regarding the data formed by the packet size and reception interval of each of the plurality of packet pairs, the estimation part sets a value about the packet size to a value along an X axis and sets a value about the reception interval to a value along a Y axis;

wherein the estimation part displaces a first straight line without a slope from the X axis in a positive direction along the Y axis until the first straight line reaches a minimum reception interval value and rotates the straight line that has reached the minimum value around the minimum value in such a manner that the straight line goes through most reception interval values, so as to calculate a second straight line; and wherein the estimation part calculates a reciprocal of a slope of the second straight line as the physical bandwidth.

[Note 11]

The receiver according to any one of notes 1 to 10;

wherein, when the bandwidth limitation is not executed, the estimation part determines a first packet pair whose reception interval has exceeded its transmission interval among the packet pairs forming the individual packet train received and calculates the available bandwidth in the network based on a packet size of a packet transmitted immediately before the determined packet pair and a corresponding transmission interval.

[Note 12]

The receiver according to any one of notes 1 to 11; the transmitter is requested to transmit the packet train(s).

[Note 13]

See the communication system according to the above second aspect.

[Note 14]

See the available bandwidth estimation method according to the above third aspect.

[Note 15]

See the storage medium in which a program is stored according to the above fourth aspect.

The modes in notes 13 to 15 can be expanded in the same way as the mode in note 1 is expanded into the modes in notes 2 to 12.

The disclosure of each of the above PTLs, etc. that have been referred to is incorporated herein by reference thereto. Variations and adjustments of the exemplary embodiments and examples are possible within the scope of the overall disclosure (including the claims) of the present invention and based on the basic technical concept of the present invention. Various combinations and selections of various disclosed elements (including the elements in each of the claims, exemplary embodiments, examples, drawings, etc.) are possible within the scope of the overall disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10 server
20 terminal
21 CPU (central processing unit)
22 memory
23 input-output interface
24 wireless communication circuit
25 antenna
30 transmitter
31, 100 receiver
32, 33 transceiver
40 packet train transmission apparatus
101 reception part
102 determination part
103 estimation part
201, 301 communication control part
202, 302 bandwidth estimation control part
203 packet train generation part
303, 303a bandwidth limitation determination part
304, 304a available bandwidth estimation part
401, 402, 403 straight line

The invention claimed is:

1. A receiver, comprising:
a reception part that receives at least one packet train whose packet size gradually increases at certain transmission intervals;
a determination part that determines whether bandwidth limitation is executed in a network based on the received at least one packet train; and
an estimation part that selects a method for estimating an available bandwidth in the network based on whether or not the bandwidth limitation is executed and estimates the available bandwidth in the network in accordance with the selected method,
wherein, when the bandwidth limitation is executed, the estimation part generates a packet pair from an individual packet train received, calculates a physical bandwidth in the network based on information obtained from the generated packet pair, and determines the calculated physical bandwidth to be an estimated value of the available bandwidth in the network.

2. The receiver according to claim 1;
wherein the determination part calculates at least one characteristics value about at least one packet discarded among the packets forming the transmitted at least one packet train; and
wherein the determination part determines whether the bandwidth limitation is executed by performing threshold processing on the at least one characteristics value.

3. The receiver according to claim 2; wherein the determination part calculates at least one ratio of a total number of packets discarded among the packets transmitted as the at least one packet train with respect to a total number of packets transmitted as the at least one packet train as the at least one characteristics value.

4. The receiver according to claim 2; wherein the determination part calculates at least one data string including, as at least one element, the number of consecutively discarded packets among the packets forming the transmitted at least one packet train and calculates at least one variance to mean ratio of the calculated at least one data string as the at least one characteristics value.

5. The receiver according to claim 1; wherein the estimation part calculates the physical bandwidth based on at least one packet size of at least one of the two packets of the packet pair and a reception interval between the two packets forming the packet pair.

6. The receiver according to claim 1; wherein the estimation part generates a plurality of packet pairs from the individual packet train received, calculates a physical bandwidth from each of the generated plurality of packet pairs, and determines a minimum physical bandwidth of the plurality of physical bandwidths calculated to be an estimated value of the available bandwidth in the network.

7. The receiver according to claim 1; wherein the estimation part generates a plurality of packet pairs from the individual packet train received and calculates, regarding each of the plurality of packet pairs generated, the physical bandwidth by performing curve fitting on data formed by at least one packet size of at least one of the two packets forming the packet pair and an reception interval between the two packets forming the packet pair.

8. The receiver according to claim 7; wherein the estimation part calculates a reciprocal of a slope of a straight line obtained by applying a least-squares method to the data including the packet sizes and the reception intervals as the physical bandwidth.

9. The receiver according to claim 7;
wherein, regarding the data formed by the packet size and reception interval of each of the plurality of packet pairs, the estimation part sets a value about the packet size to a value along an X axis and sets a value about the reception interval to a value along a Y axis;
wherein the estimation part displaces a first straight line without a slope from the X axis in a positive direction along the Y axis until the first straight line reaches a minimum reception interval value and rotates the straight line that has reached the minimum value around the minimum value in such a manner that the straight line goes through most reception interval values, so as to calculate a second straight line; and
wherein the estimation part calculates a reciprocal of a slope of the second straight line as the physical bandwidth.

10. The receiver according to claim 1;
wherein, when the bandwidth limitation is not executed, the estimation part determines a first packet pair whose reception interval has exceeded its transmission interval among the packet pairs forming the individual packet train received and calculates the available bandwidth in the network based on a packet size of a packet transmitted immediately before the determined packet pair and a corresponding transmission interval.

11. The receiver according to claim 1; wherein the receiver requests a transmitter to transmit the at least one packet train.

12. An available bandwidth estimation method, comprising:
causing a receiver that receives at least one packet train whose packet size gradually increases at certain transmission intervals to determine whether bandwidth limitation is executed in a network based on the received at least one packet train;
causing the receiver to select a method for estimating an available bandwidth in the network based on whether or not the bandwidth limitation is executed;
causing the receiver to generate a packet pair from an individual packet train received, when the bandwidth limitation is executed;
causing the receiver to calculate a physical bandwidth in the network based on information obtained from the generated packet pair; and
causing the receiver to determine the calculated physical bandwidth to be an estimated value of the available bandwidth in the network.

13. The available bandwidth estimation method according to claim 12, comprising:
calculating at least one characteristics value about at least one packet discarded among the packets forming the transmitted at least one packet train; and
determining whether the bandwidth limitation is executed by performing threshold processing on the at least one characteristics value.

14. The available bandwidth estimation method according to claim 13, comprising:
calculating at least one ratio of a total number of packets discarded among the packets transmitted as the at least one packet train with respect to a total number of packets transmitted as the at least one packet train as the at least one characteristics value.

15. the available bandwidth estimation method according to claim 13, comprising:
calculating at least one data string including, as at least one element, the number of consecutively discarded packets among the packets forming the transmitted at least one packet train; and
calculating at least one variance to mean ratio of the calculated at least one data string as the at least one characteristics value.

16. The available bandwidth estimation method according to claim 12, comprising:
calculating the physical bandwidth based on at least one packet size of at least one of the two packets of the packet pair and a reception interval between the two packets forming the packet pair.

17. The available bandwidth estimation method according to claim 12, comprising:
generating a plurality of packet pairs from the individual packet train received;
calculating a physical bandwidth from each of the generated plurality of packet pairs; and
determining a minimum physical bandwidth of the plurality of physical bandwidths calculated to be an estimated value of the available bandwidth in the network.

18. A non-transient computer readable storage medium in which a program is stored, the program causing a computer included in a receiver that receives at least one packet train whose packet size gradually increases at certain transmission intervals to execute processing for:
determining whether bandwidth limitation is executed in a network based on the received at least one packet train;
selecting a method for estimating an available bandwidth in the network based on whether or not the bandwidth limitation is executed;
generating a packet pair from an individual packet train received, when the bandwidth limitation is executed;
calculating a physical bandwidth in the network based on information obtained from the generated packet pair; and
determining the calculated physical bandwidth to be an estimated value of the available bandwidth in the network.

* * * * *